United States Patent
Kampmann et al.

(10) Patent No.: US 7,843,959 B2
(45) Date of Patent: Nov. 30, 2010

(54) PRIORITISING DATA ELEMENTS OF A DATA STREAM

(75) Inventors: Markus Kampmann, Aachen (DE); Uwe Horn, Aachen (DE); Joachim Sachs, Aachen (DE); Jan Kritzner, Aachen (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 480 days.

(21) Appl. No.: 10/597,453

(22) PCT Filed: Jan. 30, 2004

(86) PCT No.: PCT/EP2004/000837

§ 371 (c)(1),
(2), (4) Date: Jul. 2, 2008

(87) PCT Pub. No.: WO2005/076218

PCT Pub. Date: Aug. 18, 2005

(65) Prior Publication Data

US 2008/0256091 A1    Oct. 16, 2008

(51) Int. Cl.
- H04J 3/16 (2006.01)
- H04J 3/00 (2006.01)
- H04B 7/212 (2006.01)
- H04N 7/12 (2006.01)

(52) U.S. Cl. .............. 370/465; 370/336; 370/347; 375/240.12

(58) Field of Classification Search .......... 370/203, 370/208, 310, 315, 316, 319, 320, 328, 329, 370/336, 340, 341, 345, 347, 464, 465; 375/240, 375/240.01, 240.12, 259, 260, 267, 240.14
See application file for complete search history.

(56) References Cited

U.S. PATENT DOCUMENTS

| | | | |
|---|---|---|---|
| 5,406,551 A * | 4/1995 | Saito et al. | 370/203 |
| 6,567,781 B1 | 5/2003 | Lafe | |
| 7,242,715 B2 * | 7/2007 | Kim et al. | 375/240.12 |
| 7,283,508 B2 * | 10/2007 | Choi et al. | 370/341 |
| 2002/0094028 A1 * | 7/2002 | Kimoto | 375/240.14 |
| 2003/0128658 A1 * | 7/2003 | Walton et al. | 370/208 |
| 2003/0217091 A1 | 11/2003 | Teraguchi et al. | |
| 2004/0008766 A1 | 1/2004 | Wang et al. | |
| 2004/0131021 A1 * | 7/2004 | Kanemoto et al. | 370/320 |
| 2004/0234004 A1 * | 11/2004 | Ketchum et al. | 375/267 |

FOREIGN PATENT DOCUMENTS

WO    WO 00/79799 A    12/2000

OTHER PUBLICATIONS

Legible reference AB from IDS dated Mar. 30, 2010.*
Lippman, Alan. Video Coding for Multiple Target Audiences. Proc. Visual Communications and Image Processing. SPIE vol. 3653 0277-786X/98. Jan. 1999. San Jose, CA.

(Continued)

*Primary Examiner*—Ricky Ngo
*Assistant Examiner*—Paul Masur

(57) ABSTRACT

The invention relates to prioritising of data elements of a data stream for transmission to a receiving device including determining a decodability of data elements, wherein the decodability indicates the extent to which the current data element is decodable at the receiving device. Then, a priority is assigned to the data elements based on the determined decodabilities. A transmission of the data elements to a receiving device is then scheduled based on the priorities.

34 Claims, 8 Drawing Sheets

OTHER PUBLICATIONS

Domanski, M. et al. Modified MPEG-2 Video Coders with Efficient Multi-Layer Scalability. IEEE International Conference on Image Processing. Oct. 2001.

Kang, Sang et al. Packet Scheduling Algorithm for Wireless Video Streaming. Video and Image Processing Lab, UC Berkely. Apr. 2002.

Chou, Philip et al. Rate-Distortion Optimized Streaming of Packetized Media. Microsoft Research. Tech. Rep. MSR-TR-2001-35. Feb. 2001 (see also IEEE Transactions on Multimedia, vol. 8, No. 2. Apr. 2006.).

* cited by examiner

PRIORITISING DATA ELEMENTS OF A DATA STREAM

FIELD OF THE INVENTION

The present invention relates to prioritising data elements of a data stream for transmission to a receiving device.

BACKGROUND OF THE INVENTION

With the increased proliferation of data processing devices and with increased availability of computer networks for data exchange an increasing number of services can now be obtained using home computer equipment or similar.

Generally, the provision of a service via a computer network requires a transmission device or server for transmitting data pertaining to the service and requires a receiving device or client for receiving the data from the server. A user operating the receiving device may then appropriately take notice of the received data, e.g. view the received data on a display, or listen to audio data. Interactive services enable a user to control the service provision via entering information at the client for transmission to the server, enabling the server to appropriately configure the service provision.

A service provided over a computer network may require the exchange of substantial amounts of data, for example image or audio data, and, as the network bandwidth is generally limited, data compression or coding techniques have been developed. These techniques reduce the amount of data to be transmitted via the network, preferably without substantially degrading the quality of the data obtained at the receiver. Many data compression techniques for image data, including video, and audio data are available today.

One group of services available over computer networks includes the transmission of data streams from a transmitting device to a receiving device. The data stream may incorporate a sequence of images, such as a video sequence, or may incorporate audio data, or both. For example, a user at a client computer device may obtain a steaming service by appropriately selecting an offered data stream, e.g. by clicking on a corresponding icon on a browser screen. The user could view a browser page on the client display including for example a selection of text elements accompanied by a tag offering a corresponding video. The user can then select a desired tag and a selection instruction will be transmitted to a server, requesting the server to initiate transmission of a corresponding video data stream to the client device. The client device in turn will display the video sequence.

As a data stream usually contains a large amount of data to be transmitted under relatively strict time constrains, e.g. for maintaining real time requirements, efficient data compression techniques or codecs are required.

Streaming applications generally involve the use of predictive coding. A data stream is usually formed by the sequential transmission of a number of data elements, each of the data elements representing a portion of the information to be steamed to the receiving device. Predictive coding includes any data compression or coding technique, where at least some of the data elements refer to or require information transmitted in another data element. A data element requiring information from another data element can therefore be decompressed at the receiving device only to full extent, if the required further data element or data elements are available at the receiving device. For example, predictive coding may include a statistical estimation procedure where future random variables of the data stream are estimated or predicted from past and present observable random variables.

Streaming applications between computers may be hampered by a lack of service support. Generally it is difficult to reserve a bandwidth, e.g. on a computer network, for the streaming application and for this reason a transmitting device may be unable to transmit the complete streaming information to the receiving device in a timely manner. If not all data elements of the streaming application can be transmitted in a timely manner to the receiving device, a video, audio or other data stream may be interrupted or fully terminated.

It is therefore required to appropriately scale down a required bandwidth for the data steam transmission while accepting a more or less severe reduction of the quality of the stream but avoiding dropouts or termination of services.

One approach to scale the required bandwidth of a data stream is stream switching was proposed in "Video coding for multiple target audiences" by A. Lipman in Proc. Visual Communications and Image Processing, San José, Calif., USA, January 1999, pages 780-782. Here a server dynamically switches between different streams representing the same video stream in different qualities and thus with different bandwidth requirements. However, the granularity of the adjustment is coarse and a large number of streams must be stored.

A block-based hybrid video coder capable of providing a more granular scalability by supporting spatial, signal to noise and temporal scalability and combined methods are described in reference to M. Domanski, S. Mackowia, "Modified mpeg-2 video coders with efficient multi-layer scalability", in Proc. IEEE International Conference on Image Processing, (ICIP 2001), Thessaloniki, October 2001, pp. 1003-36. Here, a video stream is subdivided into several layers of increasing detail and the number of transmitted layers can be varied. However, the overhead may not be acceptable.

A further concept to adaptively reduce a bandwidth requirement of a data stream is proposed in reference S. Kang and A Zakhor, "Packet scheduling algorithm for wireless video streaming" in Proc. Of the $12^{th}$ Packet Video Workshop 2002, Pittsburgh, Pa., April 2002. In this concept the dependencies between individual frames constituting the data stream are taken into account, and, frames depending on a reference frame, which was not transmitted, are dropped.

Another concept for adapted bandwidth reduction was proposed in P. Chou and Z. Miao, "Rate-distortion optimised streaming of packetized media," Microsoft Research, Techn. Rep. MSR-TR-2001-35, February 2001, optimising a peak signal to noise ratio of a video stream by dynamically assigning priority values to frames constituting the data stream and therefore quantifying the importance.

However, none of the above yields satisfactory results under all operating conditions.

SUMMARY OF THE INVENTION

It is therefore an object of the invention to provide for improved priority assignment to data elements of a data stream for transmission from a transmitting device to a receiving device.

A transmission device for prioritising data elements of a data stream for transmission to a receiving device comprises decodability determining means for determining a decodability of a current data element, the decodability indicating the extent to which the current data element is decodable at the receiving device; prioritising means for assigning a priority to the current data element based on the determined decodability; and a transmitter controller for scheduling a transmission of the current data element to the receiving device based on the priority. Thus, the invention enables employing the decodability of a data element at the receiving device for determining a priority of the data element to be used when scheduling the transmission.

According to advantageous embodiment the decodability determining means is adapted to determine the decodability of the current data element using information on which of a plurality of data elements were transmitted to the receiving device. Thus, the transmission device may employ information on the availability of data elements and the receiving device for determining a decodability of a data element.

According to another embodiment the decodability determining means receives a feedback from the receiving device, the feedback indicating which of the data elements were received error-free. Accordingly, the transmission device may employ example acknowledgements in a packet or block transmission system for obtaining information on which of the data elements were successfully transmitted to the receiving device.

According to another embodiment, if the current data element requires a reference data element for being fully decodable at the receiving device, the decodability of the current data element is set equal to the decodability of the reference data element, when the second data element has been transmitted. Similarly, if the current data element requires multiple reference data elements for being fully decodable at the receiving device, the decodability of the current data element is determined based on the decodabilities of the reference data elements. Thus, it is possible to determine a decodability in cases of multiple dependencies between different data elements.

According to another embodiment the decodability determining means is adapted to recalculate the decodability of at least a portion of the data elements upon transmission of the current data element. Preferably, the decodability of such data elements is recalculated, which are indicated in a decoding dependency record of the current data element, the decoding dependency record indicating all data elements requiring the current data element for decoding. Thus, the transmission device may dynamically update the decodabilities of the data elements, and may reduce complexity of the updating procedure, by referring to decoding dependency records.

According to another embodiment the data stream may comprise independent data elements being independent from other data elements and dependent data elements being dependent on at least one reference data element, wherein the decodability of an independent data element is set to a maximum decodability and the decodability of a dependent data element is set equal to the decodability of a reference data element, when the reference data element has been transmitted. Accordingly, the transmission device may efficiently handle data streams comprising independent and dependent data elements.

According to another embodiment, the data stream comprises intra-blocks being independent from other data elements and the decodability of an intra-block being set to a maximum decodability, indicating that the intra-block is fully decodable at the receiving device; inter-blocks encoding differences between content of data element and content of a reference data element, the decodability of an inter-block being set equal to the decodability of the reference data block; and skip-blocks indicating content requiring content of a reference data block, the decodability of an inter-block being set equal to the decodability of the reference data block. Thus, for example in video streaming applications, decodability based prioritising of transmission blocks may advantageously be employed.

According to another embodiment, the decodability determining means is adapted determine an average decodability of a number of data elements; to determine a decodability increase of the average decodability of the number of data elements obtainable by transmitting the current data elements; and to determine the priority of the current data element based on the decodability increase. Accordingly, the overall benefit of the transmission of a data element may be employed for assigning a priority to a data element.

According to another embodiment the prioritising means may be adapted to determine the priority of the current data element based on the decodability increase divided by the size of the current data element. Accordingly, a packet size may be used to further improve the priority assigning process.

According to another embodiment the number of data elements represents data elements of a predetermined time window of the data stream or of the entire data stream.

According to another embodiment the transmitter controller is adapted to estimate the probability of an error-free transmission of a transmission channel. Thus, in the absence for example of an acknowledgement of received error-free packet at the receiving device, the transmitting device may estimate the error probability of the transmission channel, e.g. for use in determining a decodability.

According to another embodiment, the decodability determining means determine the decodability as a product of the extent to which the current data element is decodable at the receiving device and the probability of an error-free transmission of the current data packet over a transmission channel. Further, the decodability of an independent data element may be set to be equal to the determined probability, and the decodability of a dependent data element may be set equal to the determined probability times the decodability determine based on the decodability of the at least one reference data element.

According to another embodiment, the decodability determining means sets the decodability of an intra-block equal to the probability of an error-free transmission, sets the decodability of an inter-block equal to the decodability of the reference data block multiplied by the probability of an error-free transmission; and the decodability of a skip block independent of the probability of an error-free transmission.

According to another embodiment, the decodability determining means is adapted to set the decodability of the reference data element equal to the decodability of a data frame containing the reference data element.

Further, if the data stream is a video stream, for reducing a complexity, motion compensation for determining a decodability may be disregarded.

According to another embodiment of the invention, a transmission method for prioritising data elements of a data stream for transmission to a receiving device may comprise determining a decodability of a current data element, the decodability indicating the extent to which the current data element is decodable at the receiving device; assigning a priority to the current data element based on the determined decodability; and scheduling a transmission of the current data element to the receiving device based on the priority.

Further features of the invention are disclosed in further claims.

DETAILED DESCRIPTION OF THE PREFERRED EMBODIMENTS

In the following an embodiment of the invention will be described with regard to FIG. 1.

Figure 1:
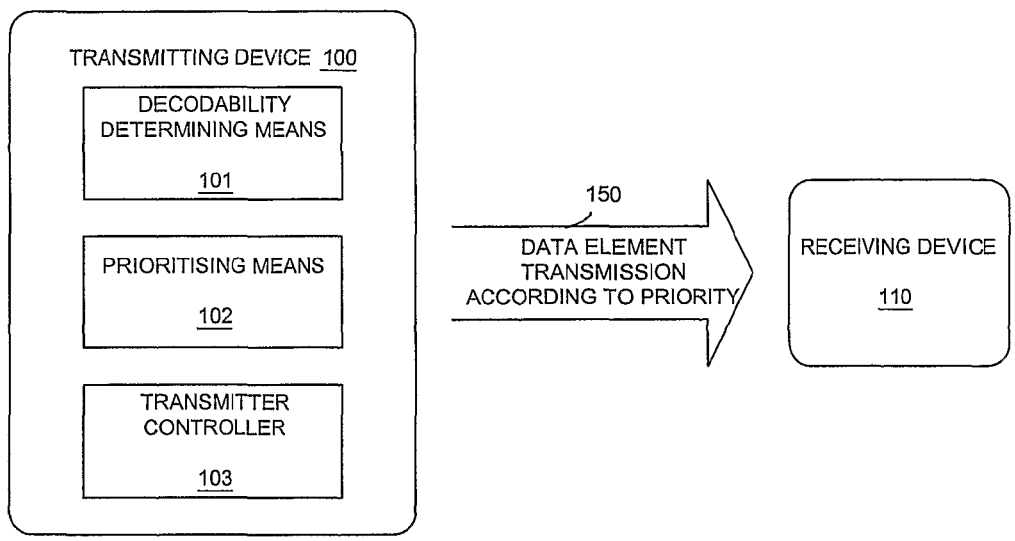
FIG. 1 illustrates elements of a transmission system according to an embodiment of the invention.

FIG. 1 schematically illustrates elements of a system for prioritising data elements for transmission from a transmitting device to a receiving device including determining decodabilities of data elements, assigning priorities to the data elements based on the determined decodabilities and scheduling a transmission of the data elements to the receiving device based on the priority.

FIG. 1 depicts a transmission device denoted 100 for prioritising data elements of a data stream for transmission to a receiving device 110. A data element transmission performed in accordance with the assigned priorities from the transmitting device to the receiving device is illustrated at 150.

The transmitting device 100 comprises decodability determining means 101 for determining a decodability of a current data element, the decodability indicating the extent to which the current data element is decodable at the receiving device. Further, the transmission device comprises prioritising means 102 for assigning a priority to the current data element based on the determined decodability, and, the transmission device comprises a transmitter controller 103 for scheduling a transmission of the current data element to the receiving device based on the priority. The transmitting device thus allows considering information on the decodability of a data element at the receiving device, when assigning priorities to the data elements for planning a transmission.

If a predictive coding scheme is used for transmitting the data stream from the transmitting device to the receiving device, the extent to which a data element is decodable at the receiving device may depend on the availability of another data element at the receiving device. If this other data element is available at the receiving device, the current data element may be fully decodable, whereas, if the other data element is unavailable at the receiving device, the current data element may be not or not fully decodable at the receiving device. In an example the decodability determining means thus determines the decodability of the current data element using information on which of the data elements of the stream where already transmitted to the receiving device, allowing a prediction, whether the a currently transmitted data element is decodable.

The information on the transmission of the data elements to the receiving device may be obtained from the transmitter controller 103, i.e., the decodability determining means 101 may be informed by the transmitter controller 103 regarding the identity of the data elements which were sent via a communication channel towards the receiving device. Based on the information which data elements have been scheduled for transmission at the transmitter controller an placed onto the communication channel, the decodability determining means may deduce availability of the data element at the receiving device after a certain time required for transmission, and assuming an error free transmission channel.

Alternatively, the transmitter controller or directly the decodability determining means may receive a feedback from the receiving device indicating which of the data elements were received error free. This information may be returned to the transmitting device via an acknowledgement message, as known in the art. Having confirmed information on which data elements have been received error free at the receiving device, the determination of the decodability of a current data element can be improved.

The prioritising means receives the determined decodability of the data elements and assigns a priority to the data elements and assigns a priority to the data elements based thereon. In the simplest case the priority may directly correspond to the determined decodability of data element under consideration. Further, the prioritising means may use the nature of the data element under consideration. For example, a data element may be of high importance for the overall data stream or may include important information for a user obtaining the data stream. In this case the prioritising means will assign a high priority to such a data element. On the other hand, a data element may not be essential for the transmission of the overall data stream and/or may not be containing highly important information for a user, and in this case the prioritising means may assign a lower priority to such data elements. In an example the prioritising means determines the priority of a data element by multiplying the determined decodability of the data element with the importance of the data element for the physical transmission of the data stream or for the user. Of course, any other arithmetic combination of the importance of the data element and the decodability of the data element may be used.

When handling a data stream having multiple elements, the result of the above operations carried out by decodability determining means and the prioritising means will be a set of elements for transmission to the receiving device, the elements each having respective priorities assigned thereto.

These data elements with the associated priorities are then handed over to the transmitter controller, for enabling the transmitter controller to schedule the transmission of the data elements under consideration of their priority. Preferably, the transmitter controller will transmit data elements with the highest priority at an earliest point in time, followed by data elements with gradually lower priority.

According to the above scheme, in a streaming application highest emphasis will be put on the transmission of data elements having the highest priority, as they will at least to a high degree by decodable and as they are of high importance to the overall data stream. After having transmitted all data packets currently present with the highest priority, the transmission scheduler will turn to data packets having gradually lower priorities. Thus, the transmission scheduler will then transmit data elements with the second highest priority, then with the third highest priority and so on, until all data packets are transmitted, or, until the available bandwidth is exhausted and no further packets can be transmitted. In this case the transmission scheduler drops all packets with this priority class and even lower priority, as they cannot be accommodated in the available bandwidth.

As the decodabilities and the priorities preferably are subject to updating within certain time periods, during ongoing transmission of data elements of the data stream, in an example the transmitter controller handles data elements with constantly updated priorities, e.g. with data elements being upgraded to highest priority or with new data elements of highest priority or any other priority arriving from the prioritising means. As the transmitter controller, upon encountering data elements with highest priority will always transmit such an element first and then will transmit data elements with gradually lower priority, it will be assured that the data stream is always transmitted under adaptation to a varying available bandwidth. Upon reaching a bandwidth limit, data elements of lower priorities are dropped, but as soon as larger bandwidth becomes available, the transmitter controller will be able to also transmit data elements of lower priorities, thus adapting the data stream transmission to increase available bandwidth.

In an example the transmitting device handles a continuous stream of data elements of the data stream, arriving or being retrieved from a buffer (not shown) at a for example constant rate for real time streaming, and accordingly, the decodability determining means, the prioritising means and the controller continuously operate to determine the decodability of data elements, to prioritise data elements and to transmit data elements according to priority.

Alternatively, however, it is also possible that the transmitting device treats groups of data elements as separate entities, for example if there are no interdependency between data elements of certain sets of data elements. The rate by which the transmitting device is handling data elements may be adjusted to match the playback speed of data elements of the receiving device, so that an accumulation of excessive amounts of data at the transmitting device or receiving device can be avoided, as known in the art.

In the following examples of the elements illustrated in FIG. 1 will be outlined in further detail. It is noted that the following description is by way of example only and should not be construed as limiting the application.

The transmitting device 100 may generally be any kind of data processing device with the capability of providing a data stream to a receiving device or a number of receiving devices. For example, the transmitting device may be a server connected to a computer network, and be adapted to provide one or a plurality of different data streams to one or a plurality of different receiving devices or clients. In an example the transmitting device is a web server, capable of providing content to clients upon request, for example by using HTML or XML data formats or any other kind of communication protocols. Preferably, the transmitting device 100 comprises a large data store, or is connected to such a large data store or database for having access to information to be streamed to users. Further, the transmitting device preferably comprises a central processing unit or a plurality of central processing units adapted to react to client requests and to provide data streams via the network to the clients.

A data stream may be any kind of data collection transmitted to a receiving device. The data stream may comprise video information, audio information, combinations of both or any other kind of data, for example complex 3-dimensional rendered objects or similar.

To reduce the required bandwidth for transmitting the data stream any kind of coding or compression technique may be applied, such as compression techniques of the H.263 or MPEG standards, or any other kind of streaming scheme providing a sequence of data elements with interdependencies.

The decodability determining means 101, the prioritising means 102 and the transmitter controller may be at least partially realized in software, with corresponding code instructions of the decodability determining means, the prioritising means, and the transmitter controller being stored in one or more memories, accessible by the central processing unit of the transmitting device so that the central processing unit is enabled to retrieve the respective coded instructions to execute the functionality of the decodability determining means, the prioritising means and the transmitter controller as detailed above.

Alternatively, or in addition thereto the above elements may at least partially be realized as dedicated hardware circuits. As one example, the transmitter controller may comprise a codec or compression unit, constituted by a hardware circuit, which handles the computationally intense operations of the coding or compression of information of the data stream.

The data elements may be any collection of a portion of the data of the data stream. For example, the data stream may be partitioned into data elements with the same or variable size during a coding or compression operation at the transmitting device. Alternatively, the data stream may be partitioned into data elements before or after a coding or compression operation. The data elements may have different types of content, e.g. data describing the structure of the data stream or data for presentation to a user. Moreover, the data elements may be grouped into larger entities, such as frames, data packets for transmission via a packet switched network, and similar.

The transmission of the data elements from the transmitting device 100 to the receiving device 110 illustrated in FIG. 1 at 150 may be accomplished via any kind of transmission medium, including dedicated communication links, connectionless connections, computer networks, wireline or wireless links and similar. For example, the transmission may involve the Internet, local area networks, ad-hoc networks, wireless networks such as according to the GSM, UMTS, D-AMPS, 3G standards and similar, alone or in combination.

According to another example, the streaming service can be provided in a client server environment, the server streaming the data stream to the client or a plurality of clients. According to an alternative a proxy is provided between the server and the client, for delivering the data stream to the client(s), e.g. with a high bandwidth transmission capability between the server and the proxy and a lower bandwidth transmission between the proxy and the client. In this case the proxy may at least provide some of the above and below described functionalities for prioritising the data elements of the data stream for transmission to a receiving device, i.e. to at least some extent assume the functionalities of the transmission device. However, it is also possible that the proxy only forwards data elements appropriately handled by the sever acting at least partially as the transmission device.

In the following a further embodiment of the invention will be described with regard to FIG. 2.

Figure 2:
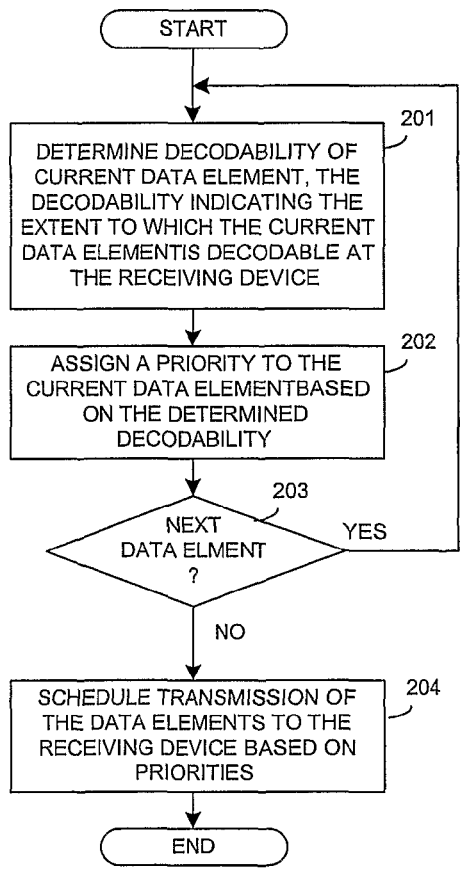
FIG. 2 illustrates elements of a method for prioritising data elements of a data stream for transmission to a receiving device according to an embodiment of the invention.

FIG. 2 illustrates operations of a method for prioritising data elements of a data stream for transmission to a receiving device and the operations of FIG. 2 may be carried using the hardware arrangement showing in FIG. 1 however, not being limited thereto.

In a first operation 201 in the decodability of a currently considered data element is determined, the decodability indicating the extent to which the current data element is potentially decodable at the receiving device. For example, the current data element may require information of another data element in order to be decodable, and therefore the decodability may depend on the availability of the other data element at the receiving device.

In another example the decodability depends on the probability of an error free transmission of the currently considered data element to the receiving device. This probability will generally depend on the characteristics of the transmission channel or network used for transmitting the data element from the transmitting device to the receiving device, as it will be outlined further below. The error probability may be a fixed value or may be a variable entity, depending on varying conditions on the transmission medium, e.g. transmission channel or transmission network.

The decodability of the currently considered data element can be determined on the basis of information on which of a plurality of data elements was transmitted to the receiving device. This information may for example be obtained locally within the transmitting device, e.g. from a transmitter controller such as the transmitter controller 103 shown in FIG. 1. In one example the transmitter controller maintains a log of all data elements, which have been transmitted to the receiving device, i.e., which have been placed on the transmission medium in a 'send and forget' scheme. In this case it may be assumed that the data element placed on the transmission medium actually arrive at the receiving device and thus be available at the receiving device.

In addition thereto assumptions may be made on the basis of an error probability, i.e. that a data element placed on the transmission medium actually arrives uncorrupted at the receiving device. The probability may be determined heuristically, by measuring the characteristics of the transmission channel. For example, in a wireless environment signal characteristics can be measured to deduce a probability of uncorrupted transmittal of a data element to the receiving device. In a packet network measurements may be made as to the probability of loosing a data packet on its way to the receiving device.

According to another embodiment the information on which of the plurality of data elements was already transmitted to the receiving device may be obtained on the basis of an acknowledgement sent back from the receiving device to the transmitting device, indicating which of the data elements were received and error free at the receiving device, or which were successfully decodable at the receiving device.

After determining the decodability of the current data element, in an operation 202 a priority is assigned to the current data element based on the determined decodability. In one example the priority of the current data element is set equal or proportional to the previously determined decodability of this data element.

Further, the priority of the current data element may be selected on the basis of further information regarding the data element, such as its importance for the data stream transmission, e.g. decodability of the entire data stream. For example, a data element may contain basic information specifying the characteristics of the data stream including partitioning of data elements, transmission rates and similar, and the absence of the availability of this information at the receiving device may make it difficult or impossible to decode the data stream.

Alternatively or in addition thereto the priority of the data element may be set based on information on the importance of the information content of the data element for a user handling the data stream at the receiving device. For example, in a video or audio sequence certain data elements of the data stream may contain important notifications or indications for the user and these data elements will be associated with a priority. Likewise, data elements with information of lesser importance, such as data elements containing purely image data or audio data containing background noise may be associated with a low priority, as their content will neither impair the overall handling of the data stream at the receiving device, nor severely degrade the quality of the data stream as perceived by a user.

The priority value of the data element may be obtained by appropriately processing the above additional information on the data element with the determined decodability of the data element. In one embodiment the priority is determined by multiplying the above additional information on data elements with the previously determined decodability. However, other arithmetic operations are conceivable, such as adding the additional information and the determined decodability.

Thereafter, in an operation 203 it is determined whether another data element is present. If in operation 203 the decision is "YES", indicating that another data element is present, the flow of operations returns to operation 201, to determine the decodability of the next data element. In practical cases the data stream will comprise a large number of data elements, and according to one example all of the data elements of the data stream may be considered together, i.e., processed in the loop of operations 201, 202, and 203.

According to another example a predetermined number of data elements is processed concurrently in the loop of operations 201, 202, and 203, i.e., a predetermined amount of data can be processed concurrently. The data stream may for this purpose be arbitrarily divided into corresponding sets of data elements, or the data stream may be partitioned according to logic entities, such as data elements of a portion of the data stream with mutual dependencies. If between two groups of data elements no interrelation exists, each of the groups of data elements can be processed independently.

According to still another example, the data elements may be grouped to conform to certain time periods, i.e., in a video or audio data stream, data elements can be grouped in accordance with a certain playback period of time, such as for example one second or any other time period. The groups of data elements may be determined on the basis of a buffer size of buffer sizes available at the receiving device, so that it can always be assured that a buffer overflow at the receiving device is avoided.

If in operation 203 the decision is "NO", indicating that a next data element is not or presently not available, the flow proceeds to operation 204, and the transmission of the data elements to the receiving device based on the priority is scheduled, for example by the transmitter controller 103 shown in FIG. 1.

The transmitter controller may handle a group of data elements concurrently, i.e. may consider one group of data elements at a time for a transmission. The transmitter controller at first then selects data elements with the highest priority for transmission to the receiving device, and thereafter data elements with the second highest priority and so on, until either all data elements have been transmitted or the available bandwidth for the data stream transmission is exhausted. Data packets of lower priorities, which cannot be transmitted within the available bandwidth are dropped or discarded.

According to an alternative operations 201, 202, and 204 may be executed sequentially for each data packet, before a next data element is considered. In this case, in operations 204 each individual data element processed in operations 201 and 202 is considered for transmission.

In a practical case in the transmitter controller such as the transmitter controller 103 of the FIG. 1 will decide to transmit each data element based on the priority it received as soon as the element becomes available at the controller. Any data element having the highest priority will be transmitted immediately, so that highest emphasis is put on transmitting data packets with the highest priority. Only in case the transmitter, due to sequential processing and transmitting of the data elements, does not have any highest priority data element for transmission cueing, the transmitter controller will turn to data elements having the second highest priority. For this purpose the transmitter controller may accumulate a certain number of data elements associated with priorities, depending on the transmission bandwidth available for transmitting the data elements to the receiving device.

If the transmission bandwidth is large enough to accommodate all data packets of the data stream, the transmitter controller will be able to transmit each data element upon receiving it, no matter what priority was assigned to the data element.

However, if the transmission bandwidth of the transmission medium is lower than required for transmitting all data elements of the data stream in a timely manner, the transmitter controller will gradually accumulate data elements, as they cannot be transmitted at the same rate as they are provided through operations 201 and 202. It is noted that the rate of providing data elements through processing of operations 201 and 202 preferably matches a predetermined rate of the stream, i.e., for real time video display or audio playback.

The data elements thus received at the transmitter controller may be held in a buffer, and the transmitter controller attends to transmission of the data elements accumulated in the buffer according to their priority. As noted above the data elements with the highest priority reaching the buffer will consequently be transmitted as soon as possible, which will be at once, if no further data element having a highest priorities available, or which will be after all other previously received data elements of highest priority were transmitted. Thereafter, the transmitter controller turns to presently available data elements of the second highest priority and thereafter to data elements with gradually lower priority. Again, if the transmission bandwidth is not sufficient for transmitting all data elements of the data stream, data elements with lower priority will gradually be accumulated in the buffer, as due to the arrival of data elements having higher priority, the transmitter controller does not attend to transmitting the data elements of the lower priorities. In practical cases a certain buffer size will be provided at the transmitting device, and in practical cases, upon reaching the buffer limit at the transmitting device, data packets with the lowest priorities may be discarded from the buffer.

If after a certain period with low available transmission bandwidth the transmission bandwidth is again increased, the transmitter controller will also be able to attend to the transmission of data elements with lower priorities and the buffer will gradually be emptied.

It is noted that in addition to the priority base transmission scheme, a time limit may be introduced in association with each data element, the time limit indicating a latest time for transmitting the data element, in order to for example maintain real time playback of a data stream. Any data elements having exceeded their latest transmission time may then be discarded, as known in the art.

In the following a further embodiment of the invention will be described with regard to FIG. 3.

Figure 3:
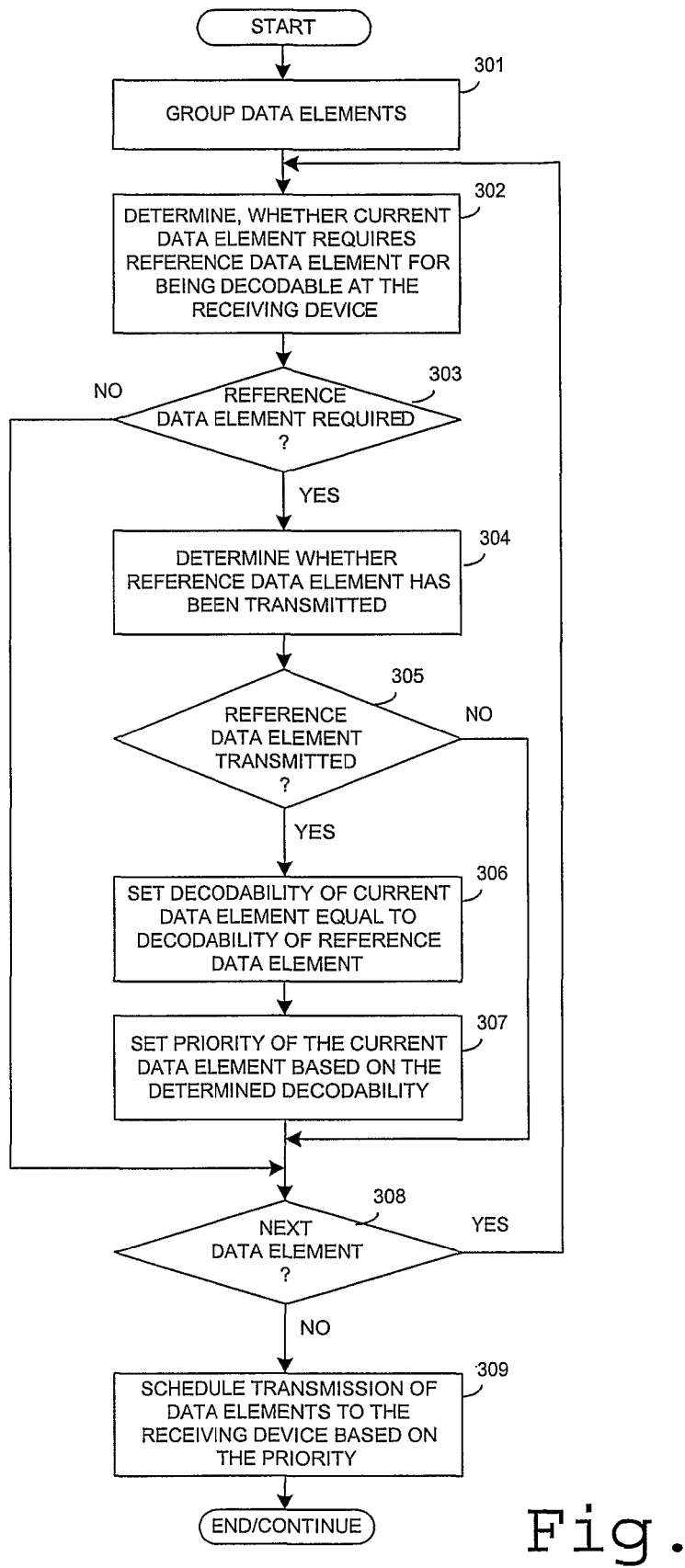
FIG. 3 illustrates operations of a method for prioritising data elements for transmission to a receiving device according to another embodiment of the invention, particularly outlining operations for using information on data elements which have been transmitted.

FIG. 3 illustrates operations of a method for prioritising data elements of a data stream for transmission to a receiving device according to another embodiment of the invention. FIG. 3 particularly illustrates operations for determining the decodability of data elements and the operations of FIG. 3 may be carried out using the hardware arrangement of FIG. 1, however, FIG. 3 is not limited thereto.

In a first operation 301 at the transmitting device data elements of the data stream are appropriately grouped. The grouping may be as it was outlined with regard to FIG. 2, i.e. predetermined or variable numbers of data elements may be grouped, or a grouping of data elements according to a playback period of time at the receiving device may be carried out. Also, the entire data stream may be considered as one group.

Thereafter, in an operation 302 it is determined whether a currently considered data element requires a data element for being decodable at the receiving device, i.e. whether it requires a reference data element. Depending on the used codec, there may be interdependencies between data elements, i.e., for the decoding process of one data element another data element may be required. For example, in a predictive coding scheme such data element dependencies are present.

According to an example, in a video sequence of images, a data element may contain image information, for example, of pixels making up one frame of the video sequence. Alternatively, in a sequence of images making up the video stream, a data element may contain difference information between a previous frame and a current frame. The current frame can then be calculated by combining the different information and the image information of the previous data element. Accordingly, at the receiving device the previous data element is required in order to appropriately obtain or decode the current data element. Moreover, data elements are conceivable, which simply contain information indicating that there was no change between the previous data element and the current data element. Accordingly, dependencies may exist from a current data element to a previous data element or elements, the previous data element(s) thus being required at the receiving device for decoding the current data element.

In operation 302 the currently considered data element may be analysed to determine whether a dependency to a previous data element exists. This information may be obtainable from the data element itself, or may be derivable from a data element type. Further, in operation 302 the identity of the required reference data element it is determined.

In an operation 303 it is decided, whether a reference data element is required. If in operation 303 the decision is "YES", indicating that a reference data element is required, in an operation 304 it is determined whether the reference data element has been transmitted. As noted before, the transmission of the reference data element can be detected locally at the transmitting device, i.e. it can be checked, whether the reference data element was placed on the transmission medium, or, acknowledgement information from the receiving device may be used, indicating whether the data element was received and/or successfully and without errors decoded at the receiving device.

In operation 305 it is then decided whether the reference data element has been transmitted. If in operation 305 the decision is "YES", the flow continues with operation 306, in which case the decodability of the current data element is set equal to the decodability of the reference data element. This reflects the fact, that the current data element is at best only decodable to an extent of the decodability of the reference data element. For example, if the reference data element is only partially decodable, the partial decodability will also affect the decodability of the current data element.

According to an example, if the decodability of the reference data element is one, indicating that the reference data element is fully decodable, the decodability of the current data element will also be set to 1, as in this case the current data element will also be fully decodable. Likewise, if the decodability of the reference data element is 0, i.e. that the reference data element is not decodable, the decodability of the current data element will also be set to 0.

The flow then continuous to operation 307, where the priority of the current data element is set based on the decodability in operation 306. Operation 307 may be as outlined with regard to previous embodiments.

Thereafter, in an operation 308 it is determined whether a next data element of the group of data elements built in operation 301 is present. If in operation 308 the decision is "YES", indicating that a further data element is present, the flow of operations returns to operation 302 for considering the next data element. If in operation 308 the decision if "NO", indicating that a next data element of the group of data elements is not available, in an operation 309 the transmissions of data elements to the receiving device is scheduled based on the respective priorities. Thereafter, the flow of operations may continue to a further group of data elements or if the end of the data stream is reached, operations may terminate.

If in operation 303 the decision was "NO", indicating that a reference data element was not required, the flow of operations may directly continue to operation 308, i.e., to the next data element, if available.

Further, if an operation 305 the decision was "NO", indicating that the reference data element was not transmitted, operations 306 and 307 are skipped, i.e. the decodability of the current data element and the priority setting is not performed, i.e. the decodability of the current data element remains as before. It is noted that initially, i.e., prior to first consideration of each particular data element the decodability will preferably be set to 0.

In an alternative, a current data element may not only depend on one reference data element, but may depend on a plurality of such reference data elements. In this case the decodability of the current data element may be set based on the decodabilities of the group of reference data elements. For example, the decodability of the current data element is set to an average decodability of the group of reference data elements. Alternatively, the decodability of the current data element may be set to the decodability of the reference data element having the lowest decodability.

In the following a further embodiment of the invention will be described with regard to FIG. 4.

Figure 4:
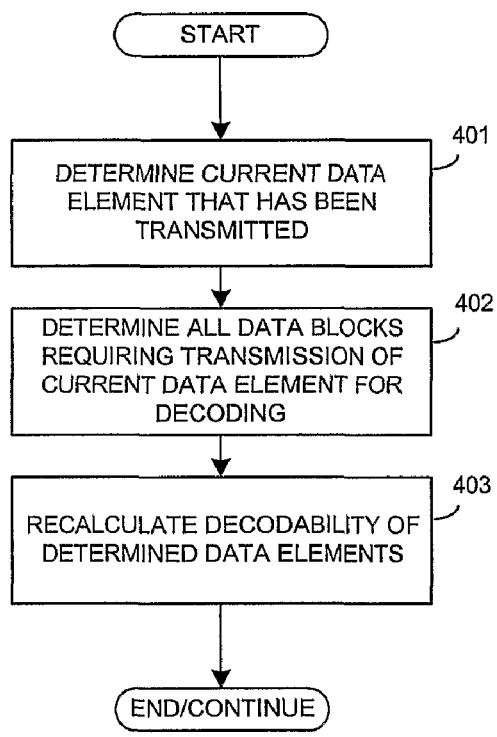
FIG. 4 illustrates operations of a method for prioritising data elements for transmission to a receiving device according to another embodiment of the invention, particularly illustrating operations for recalculating a decodability of data elements.

FIG. 4 illustrates operations of a method for prioritising data elements of a data stream for transmission to a receiving device and particularly illustrates operations to recalculate a decodability of at least a portion of the data elements of the data stream upon transmission of the data elements. The operations of FIG. 4 may be carried out using the hardware arrangement of FIG. 1, however, FIG. 4 is not limited thereto. FIG. 4 illustrates a continuous updating of the decodabilities of the not yet transmitted data elements on the basis of information regarding data elements that have been transmitted.

In a first operation 401 it is determined that a current data element has been transmitted. For example, the determination may result from a transmittal report from a transmitter controller such as the transmitter controller 103 of FIG. 1, as noted before. Further, the information on the transmission of a data element could be obtained from the receiving device, reporting reception and/or error-free decoding of the current data elements.

In a transmission scheme with a compression of the stream information into data elements that may have dependencies on one another, successful decoding of a data element at the receiving device may depend on the presence of information from another data element at the receiving device. Only if this information from the reference element is available, the dependent data element can be decoded.

Therefore, in an operation 402 all data elements requiring a transmission of the current data element for decoding are determined. The information on which data elements depend from the current data element, i.e., require information from the current data element for successful decoding at the receiving device, may be obtained by analysing the respective data elements, for example, information on dependent data elements could be noted in the current data element, or likewise, a reference data element, i.e., the current data element, could be identified in the dependent data elements. Still further, information on data elements depending from another data element may be obtainable from the position of a data element in a sequence of data elements or by a type of data elements. For example, in a decoding scheme dependent data elements may be identified as dependent and may always depend on a preceding data element.

According to another example, decodability determining means such as the decodability determining means 101 of FIG. 1 reviews a dependency record of the current data element, wherein the dependency record indicates all data elements requiring the current data element for decoding. The dependency record of the current data element may be stored in association with the current data element or may be available from a data stream log or similar sources.

Upon determining all data elements depending on the current data element, in an operation 403 the decodability of the determined dependent data element is recalculated. The calculation of the decodability may be as outlined with regard to previous embodiment.

In an example, further to the above, in operation 403 the decodabilities of all data elements are updated which depend from anyone of the data elements dependent from the currently considered data element and having recalculated decodability.

Thereafter, the flow may continue with detecting another data element transmission in operation 401, or, upon reaching the last data element of the stream, the flow may end.

The embodiment of FIG. 4 thus allows reducing a processing requirement for updating the decodabilities of the data elements upon transmitting a data element. Only data elements depending from the transmitted data element are updated regarding their decodability.

Based on the updated decodabilities of the determined data elements, the priorities may also be recalculated, such as by prioritising means 102 shown in FIG. 1, and the transmitter controller may proceed to schedule the transmission of the updated data elements according to their new priorities, as outlined before.

The operations of FIG. 4 may generally be carried out at any point in time after a data element was transmitted. The updating procedure may also be carried out after a certain number of data elements have been transmitted. For example, the updating operations of FIG. 4 may be carried out following operation 204 of FIG. 2, or operation 309 of Fig. In the following a further embodiment of the invention will be described with regard to FIG. 5.

Figure 5:
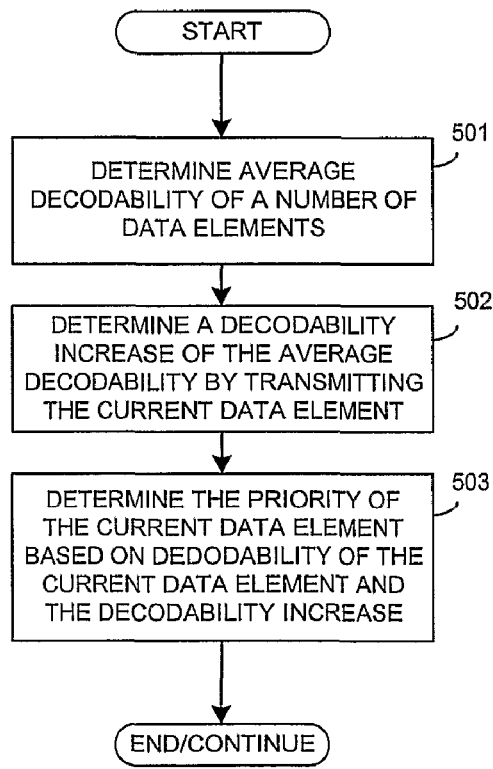
FIG. 5 illustrates operations of a method for prioritising data elements for transmission to a receiving device according to another embodiment of the invention, particularly illustrating operations for employing a decodability increase for assigning a priority.

FIG. 5 illustrates operations of a method for prioritising data elements of a data stream for transmission to a receiving device according to another embodiment of the invention, particularly outlining operations to improve a prioritisation of the data elements. The operations of FIG. 5 may be carried out using the hardware structures shown in FIG. 1, however, FIG. 5 is not limited thereto.

It was outlined before that a priority of the data elements can be determined on the basis of the decodability of each respective element, and the priority assignment may further include information on the type or nature of the data element, see the above embodiments. To further improve the prioritisation of a data element, the priority of a data element in the present embodiment is further selected on the basis of an overall improvement of the data stream achievable by transmitting the data element under consideration.

In a first operation 501 an average decodability of a number of data elements is determined. The average decodability may be an arithmetic mean value of decodability of the data elements, i.e., a sum of all decodabilities of all data elements divided by the number of data elements. However, in an alternative, other decodability values reflecting the decodability of a number of data elements under consideration may be used. The number of data elements may correspond to a predetermined amount of data, i.e., a predetermined number of data elements may be grouped. Preferably, as noted before, the group of data elements is selected such that interrelations with other groups of data elements do not exist. Alternatively, however, it is also possible that a grouping of data elements according to playback times at the receiving device are used, or that the entire data stream is considered simultaneously.

The average decodability of the number of data elements may for example be calculated by decodability determining means such as the decodability determining means 101 shown in FIG. 1.

Then, in an operation 502 it is assumed that a currently considered data element is transmitted and the effect of the transmission of the currently considered data element on the average decodability of the number of data elements is determined. Thus, in operation 502 an increase of the average decodability by transmitting the current data element is determined.

For example, if in a sequence of data elements each individual data element depends from the previous data element in the sequence, i.e., if each data element requires information from a preceding data element for being decodable at the receiving device, and only the first data element of the sequence of data elements does not depend on another data element, the decodability of each data element except the first one is zero, as long as the information of the first data element is not available at the receiving device. Thus, a transmission of the first data element will lead to a large increase of the average decodability of all considered data elements, as only with the first data element the subsequent data elements can be decoded at the receiving device. Any other data element in the data element sequence of this example will have a lesser effect, namely only onto its following data elements.

The above example illustrates that depending on the interrelation between the data elements of the data stream the transmission of a particular data element may have a larger or smaller effect on the overall decodability of the data stream.

The average decodability increase of the group of data elements under consideration then is used in an operation 503 for re-determining the priority of the current data element based on the present decodability of the current data element and the decodability increase of the number of data elements. For example, the priority of the data element under consideration could be multiplied by a value representing the average decodability increase, e.g. a normalised average decodability increase value or based on another arithmetic operation.

The operations of FIG. 5 may be carried out in association with the prioritising operations illustrated with regard to previous embodiments, i.e. operations 202 of FIG. 2 and 307 of FIG. 3, or at any other suitable point in time.

According to an alternative, the decodability increase, i.e., the increase of the average decodability of the number of data elements under considerations may be set into perspective to the size of the current data block, i.e. the bandwidth requirement for transmitting the data element.

Accordingly, the decodability increase determined in operation 502 achievable by transmitting the data element under consideration may be divided by the size of the currently considered element. Thus, the bandwidth requirements for transmitting the data element may also be entered into the process of determining a priority.

Accordingly, the embodiment of FIG. 5 can be used to differentiate between important and unimportant packets so that less important packets can be skipped if there is not enough bandwidth available. When the skipping of lesser important data elements will take place via the operations outline with regard to previous embodiments in view of scheduling the transmission of data elements according to their priority.

In the following further embodiment of the invention will be described with regard to FIG. 6.

Figure 6:
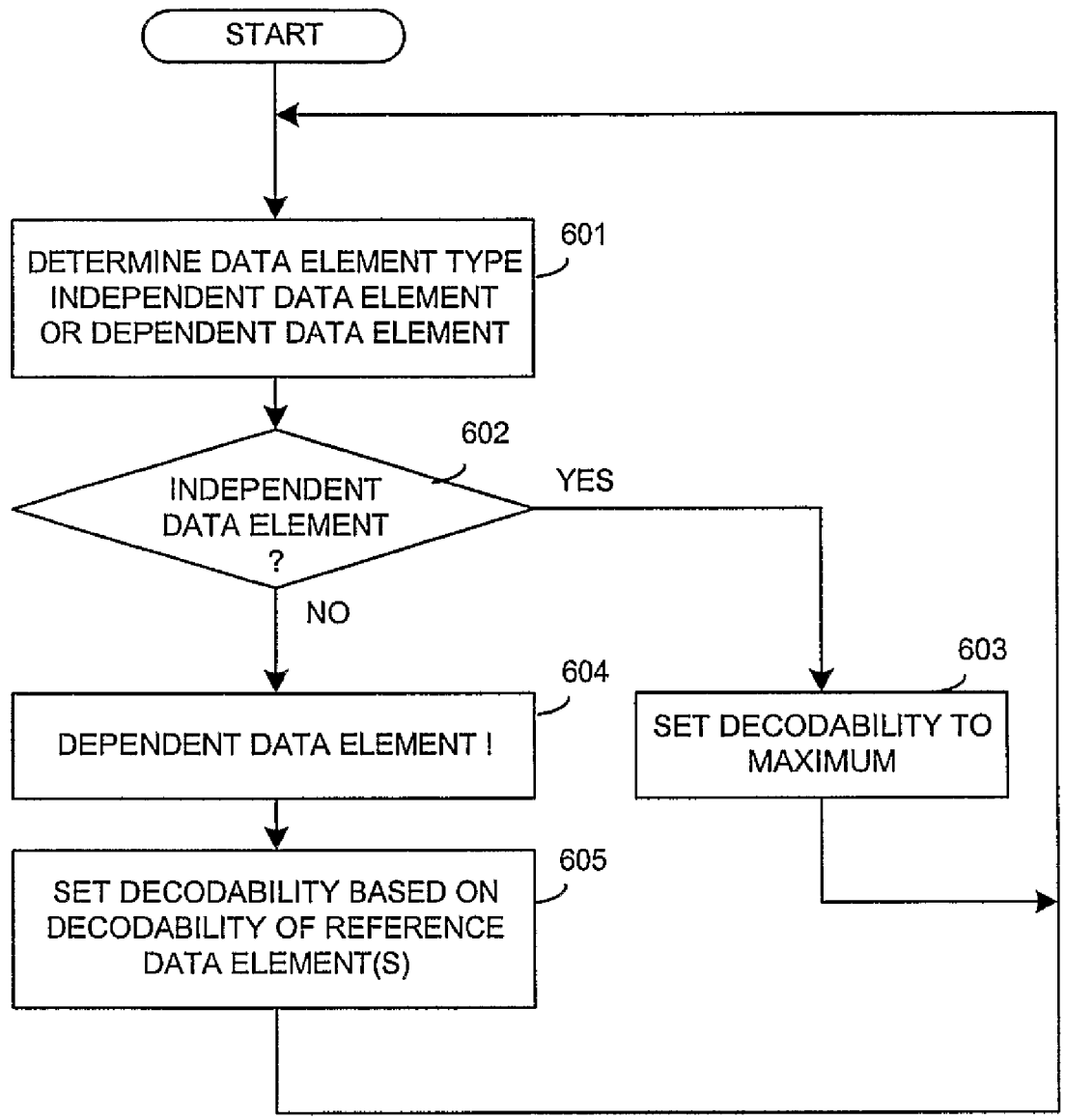
FIG. 6 illustrates operations of a method for prioritising data elements of a data stream for transmission to a receiving device according to another embodiment of the invention, particularly illustrating operations for handling independent and dependent data elements.

FIG. 6 illustrates operations of a method for prioritising data packets for transmission to a receiving device, particularly outlining the handling of data elements having different types. The operations of FIG. 6 may be carried out using the hardware structures shown in FIG. 1, however, FIG. 6 is not limited thereto.

In FIG. 6 it is assumed that a data stream comprises independent data elements being independent from other data elements in that they can be decoded at the receiving device without requirement of information from other data elements. Further, the data stream is assumed to comprise dependent data elements, being data elements, which are at least one other data element or reference data element. As noted before, a dependent data element requires information from at least one another data element for being decodable at the receiving device.

In a first operation 601 the data element type is determined, i.e., it is determined whether the data element is an independent data element or a dependent data element. The type may be determined by analysing the data element, or by reading an identifier of the element, the identifier indicating its type.

Thereafter, in an operation 602 it is decided whether the data element is an independent data element or a dependent data element. If an operation 602 the decision is "YES", indicating that the data element is an independent data element, in an operation 603 the decodability is set to a maximum value. The maximum decodability reflects the fact that the independent data element is fully decodable at the receiving device. Thereafter, the flow continues with the next data element and operation 601.

If in operation 602 the decision is "NO", in an operation 604 the data element is identified as a dependent data element. Thereafter, in an operation 605 the decodability of the dependent data element is set based on the decodability of the reference data element or data elements. If the data element is dependent only on one other data element, the decodability of the currently considered dependent data element is set to be equal to the decodability of the reference data element. It is noted that the reference data element itself may be a dependent data element, depending from yet another data element, and its decodability being set to be equal to the decodability of the further reference data element.

In operation 605, if the decodability of the data element under consideration is set, all data elements itself depending on the currently considered data element have to be updated. Thus, the decodability of all data elements depending from the currently considered (dependent) data element will correspondingly be updated, i.e., set to the decodability of the respective reference data elements.

If the data element under consideration depends from a plurality of reference data elements, the decodability may be set based on the decodability of the number of reference data elements. For example, the decodability may be set to an average decodability of all reference data elements, or to any other value based on the decodabilities as noted before.

Thereafter, the flow returns to operation 601, in order to process the next data element.

The embodiment of FIG. 6 illustrates the dynamic behaviour of the decodabilities associated with each data element, based on dependencies between data elements, and based on the fact that reference data block has been transmitted.

In the following a further embodiment of the invention will be described with regard to FIG. 7. The operations of FIG. 7 may be carried out using the hardware arrangement of FIG. 1, however, FIG. 7 is not limited thereto.

Figure 7:
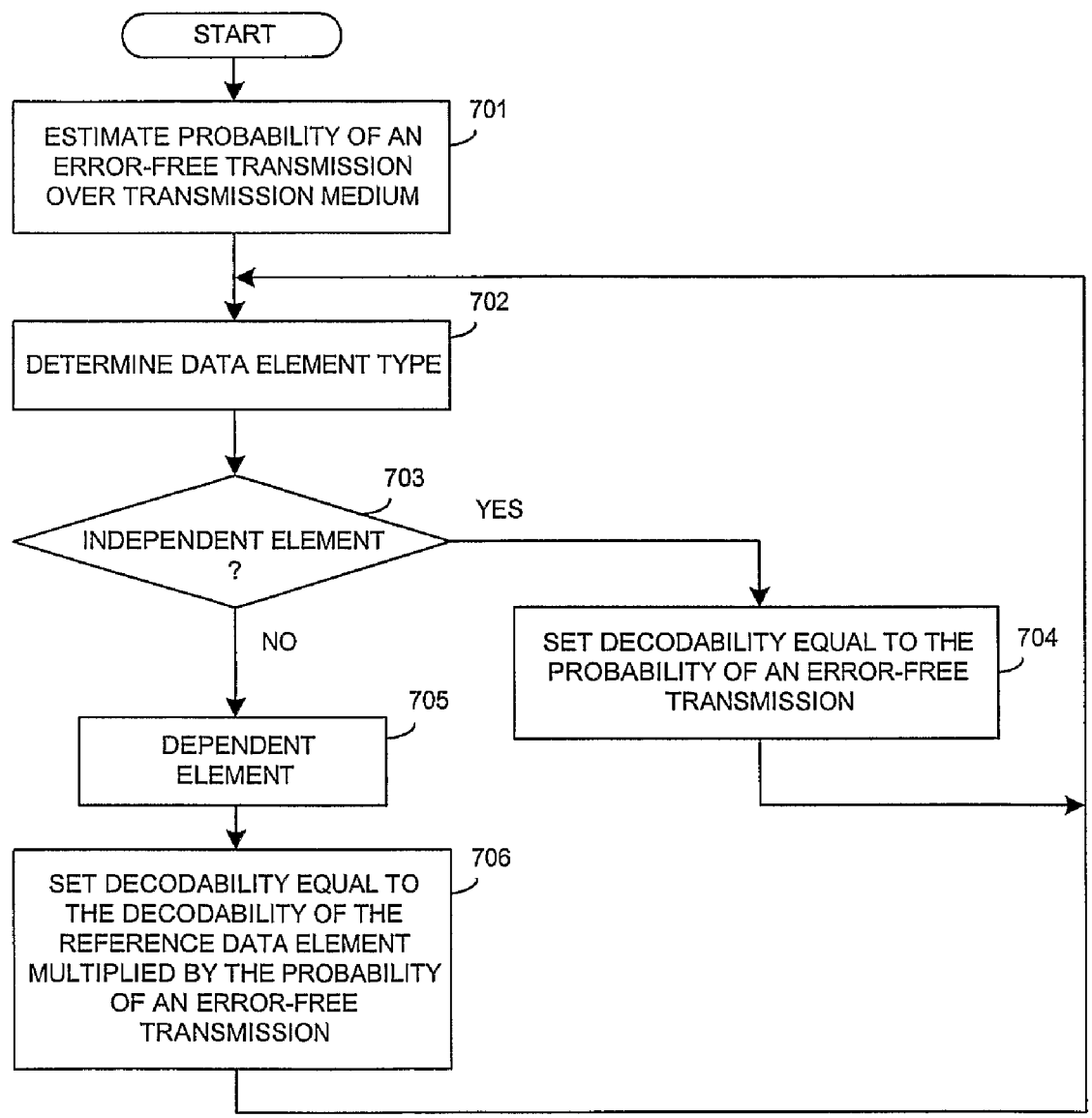
FIG. 7 illustrates operations for prioritising data elements for transmission to a receiving device according to another embodiment of the invention, particularly illustrating determining decodabilities of independent and dependent data elements.

FIG. 7 further illustrates operations for considering an error rate of a transmission channel between the transmitting device and the receiving device. For example, a transmission may be error-prone, or data elements will be lost during transmission, e.g. due to a congestion condition in a computer network. Especially in wireless connections transmission errors are frequent, and thus it may be advantageous to use information on the error rate of the transmission medium.

The embodiment of FIG. 7 is particularly advantageous in case information from the receiving device regarding successfully received and/or decoded, i.e. error free, data elements is not available. In the embodiment of FIG. 7 the transmitting device makes assumptions regarding the likelihood of successfully transmitting and decoding data elements at the receiving device, and uses this information for calculating or recalculating decodabilities and/or priorities.

In a first operation 701 the probability of an error free transmission over the used transmission medium is determined. The probability of an error free transmission may be determined heuristically, i.e. measurements may be made based on transmission on test data elements, measurements of signal characteristics and similar. Further, a probability of an error free transmission may depend on and thus be derived from information available regarding the transmission medium, e.g. a traffic load in a network, terrain conditions in wireless environments and similar.

The probability of an error-free transmission may be determined once or be determined repeatedly, e.g. if varying transmission conditions are present. Thus, the error probability may be dynamically adapted to the actual condition of the transmission medium.

Then, in an operation 702 a data element type is determined, i.e., it is determined whether the data element is an independent data element or a dependent data element, similar to operation 601 of FIG. 6.

In an operation 703 it is decided whether the data element is an independent data element, and if in operation 703 the decision is "YES", indicating that the data element is an independent data element, in an operation 704 the decodability of the data element under consideration is set equal to the probability of an error-free transmission. For example, if the probability of an error-free transmission of the data element to the receiving device is 0.99, the decodability of this data element may be set to 0.99, or to any other value proportional to 0.99.

If in operation 703 the decision is "NO", in operation 705 it is known that the data element is a dependent data element, i.e., a data element being dependent from one or more reference data elements.

Thereafter, in an operation 706 the decodability of the data element under consideration is set equal to the decodability of the reference data element multiplied by the probability of an error-free transmission.

Similarly, if a plurality of reference data elements is present, the decodability obtained on the basis of the decodabilities of the reference data elements may be transmitted by the probability of an error-free transmission of all reference data elements. For example, if two reference data elements are required at the receiving device for decoding the currently considered data element, and if a probability of an error-free transmission is 0.99, the probability of error-free transmission of both data elements is 0.99×0.99, i.e. 0.9801.

After operations 704 and 706 the flow continues with operation 702, i.e., the next data element is considered.

As shown with the above operations, the embodiment illustrated with regard to FIG. 7 allows to also consider the conditions of the transmission medium for determining a decodability and priorities of the data elements.

In the following a further embodiment of the invention will be described with regard to FIG. 8.

Figure 8:
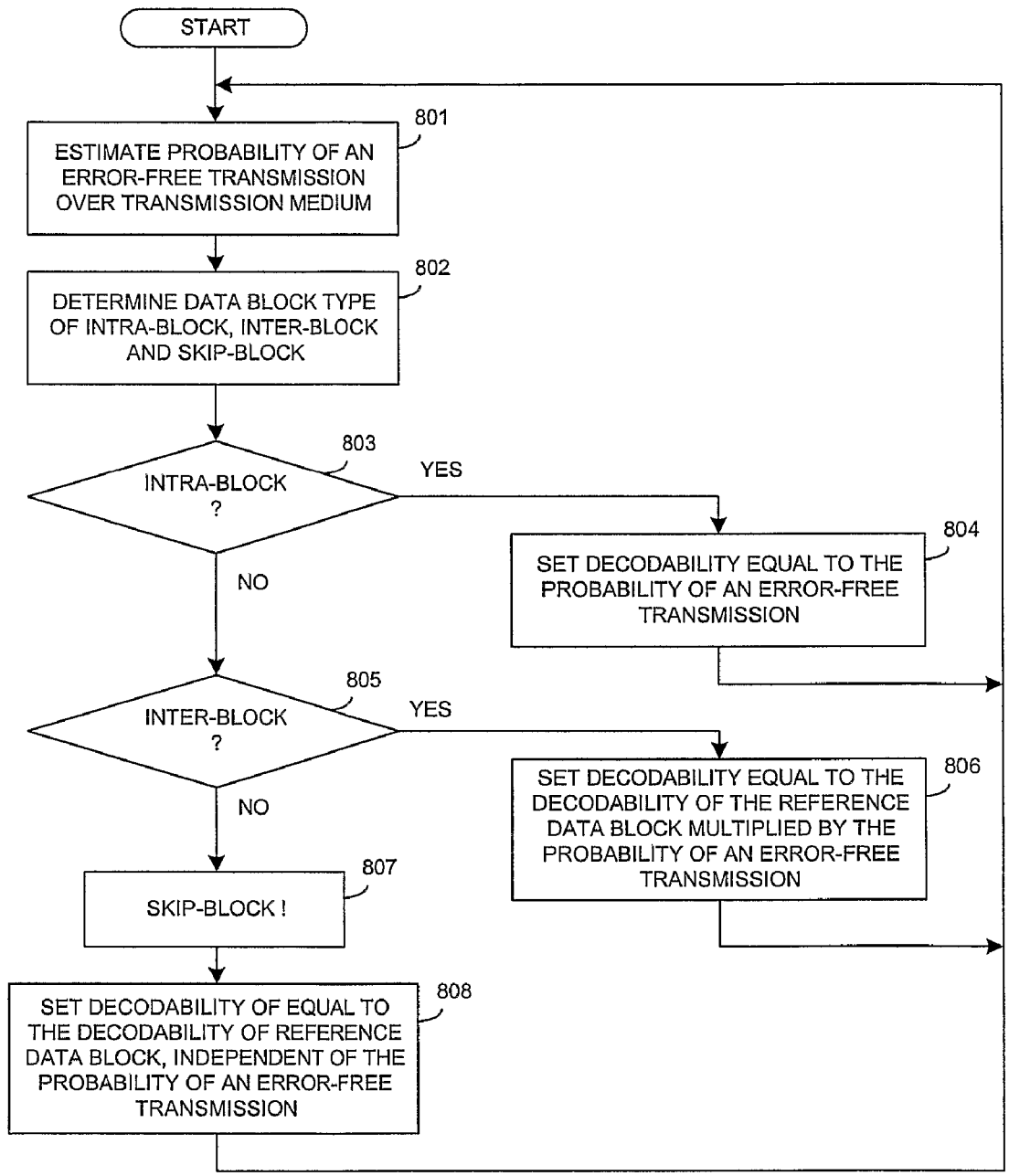
FIG. 8 illustrates operations of a method for prioritising data elements for transmission to a receiving device, particularly illustrating operations for handling intra-blocks, inter-blocks and skip-blocks, e.g. of a video stream.

FIG. 8 illustrates operations of a method for prioritising data elements for transmission to a receiving device, particularly outlining an example of a video stream. The operations of FIG. 8 may be carried out using the hardware arrangement of FIG. 1, however, FIG. 8 is not limited thereto.

In FIG. 8 it is assumed that a data-encoding scheme is used which provides three different types of data elements of the video stream, in the present embodiment called blocks. A first type of blocks, so-called intra-blocks, contains complete information of that block and can therefore be independently decoded at the receiving device. A second type of blocks, so-called inter-blocks encode the differences between the actual content of the block and previous contents. Further, an inter-block may contain a motion vector for describing the displacement of the content, e.g. picture elements, between the previous content and the present block. For decoding an inter-block, previous content is necessary. A third type of blocks, so-called skip-blocks indicate that at least a part of the skip-block is identical to at least part of a previous block and therefore the skip-block only contains a reference to that previous block in the data stream. For decoding a skip-block at the receiving device, the previous content is therefore necessary.

Intra-blocks, inter-blocks and skip-blocks may be transmitted in groups or interleaved with one another, is required and several intra-blocks, inter-blocks and skip-blocks may make up a macro-block or frame of the data stream.

In the following the operations of the current embodiment will be outlined in further detail.

In a first operation 801 the probability of an error-free transmission of a currently considered data block over the transmission channel is estimated or a previous estimation value for a probability of an error-free transmission is used. The estimation of operation 801 may be as described with regard to operation 701 of FIG. 7.

In an operation 802 the data block type of the currently considered data block is determined, i.e., it is determined whether the data block is an intra-block, inter-block or skip-block. The determination operations may be similar to operation 702 described with regard to FIG. 7.

In an operation 803 it is then determined whether the data block is an intra-block. If an operation 803 the decision is "YES", in an operation 804 the decodability of the intra-block is set equal to the probability of an error-free transmission.

If in operation 803 the decision is "NO", indicating that the data block is not an intra-block, it is determined in operation 805 whether the data block is an inter-block. If the decision is "YES", indicating that an inter-block is present, in an operation 806 the decodability of the inter-block is set equal to the decodability of the reference data block multiplied by the probability of the error-free transmission over the transmission channel.

Similarly, if the inter-block depends from a number of reference blocks, the decodability of the number of reference blocks, the decodability of the inter-block may be set based on the decodabilities of the reference blocks, as outlined before, multiplied by the probability of an error-free transmission of all reference data blocks, as outlined before.

If in operation 805 the decision is "NO", in an operation 807 it is declared that the data block is a skip-block, and in an operation 808 the decodability of the skip-block is set equal to the decodability of the reference data block or blocks, independent of the probability of an error-free transmission. This reflects the fact that the skip-block itself does not contain any image information but only refers to previously transmitted content.

According to another alternative, to reduce processing and transmission requirements, the decodability determining means may be adapted to set the decodability of the reference data element equal to the decodability of a data frame containing a multiple data elements including the reference data element. Thus, the decodabilities may only be determined on a frame basis and processing requirements may be reduced.

In a video streaming application motion compensation and thus motion vectors are normally considered for determining a decodability and/or priority. For example, a motion vector leads to a dependency of a data element from another data element and thus has influence on the decodability. However, for reducing processing requirements in a video streaming application, in another embodiment motion compensation in a video stream is disregarded. In an example, motion compensation/estimation is disregarded in connection with determining a decodability and thus in connection with assigning priorities. Accordingly, data elements, as described in the previous embodiments, or data blocks in the present case may encode differences of present image information of a data element to image information of a previous data element, but motion vectors, i.e. motion estimation and a motion compensation, are disregarded. Without handling motion vectors, decodability determining operations, prioritising operations may be significantly reduced and a complexity reduction may be achieved.

Even though in the present embodiment a video stream is considered, any other kind of data stream may be correspondingly processed, for example an audio stream or any other kind of data stream subdivided into data blocks corresponding to intra-blocks, inter-blocks and skip-blocks.

In the following a further exemplary embodiment of the invention for decodability based priority assignment for data streaming is described. In the this embodiment it is assumed that the data stream is a video stream, however, the embodiment is not limited thereto. Further, it is noted that all elements of the embodiment are all viewed as optional and advantageous features of the invention.

As noted before, streaming data such as video over packet-switched networks is an application of growing significance. Due to the best effort property of the Internet, it may not be possible to transmit the whole data stream to the receiver. Especially in the case of wireless streaming the available bandwidth is highly variable. These bandwidth limitations in combination with the real time constraints related to streaming result in protocol based packet drops at the server, because the data can not be delivered timely. Yet, there was no effective solution to avoid such situations, but their effects can be mitigated by different means.

Video decoders support error concealment algorithms, and are able to recover much of the encoded video information even if some parts of the encoded stream have not been transmitted. The effectiveness of these algorithms depends on the scalability support of the codec and the position of the error within the stream. This paper proposes a new method to scale the bandwidth requirement of a H.263 or MPEG video stream without relying on support of the codec. Its basic idea is to use the available bandwidth for the transmission of the more important parts of the encoded video stream. Temporal scalability is simulated by dropping several frames of the non-layered video stream. If the dropped frames are selected randomly, heavy distortions will arise. The first and simplest step to improve the presentation quality is assigning different priority values to the different frames within the single layer, and drop less important frames first. These values indicate the importance of a frame for the presentation of the video stream, and can either be static or dynamic.

For block based video codecs, the obvious concept is to derive the priorities from the different frame-types (I,P,B). An I-Frame is Intra-encoded and can be decoded on its own. P-Frames depend on an I- or other P-Frames and may contain only differences to these frames. B-Frames are a second type of dependant frames.

The present example describes to quantify the information available in the data frames of a video stream based on the decodability of the video stream. The decodability measures which fraction of a video is expected to be decodable at the client. The proposed example can be used similarly to the rate-distortion optimized algorithms for a dynamic generation of priorities, but does not rely on the unknown distortion values. It is based on the internal structure of the stream, which can either be derived from the encoder logs or extracted from the stream.

The example can be generalized to other data sets than video streams containing dependent, independent and transparent elements.

In the present embodiment it is assumed that the basic data unit of a transmission system is a frame and these logical frames are considered to be the same as the encoded video frames, i.e. data elements. The model of the video stream is e.g. based on the H.263 video codec. B-Frames and Reference Picture Selection are neglected within this simplified model, so the GOFs consist of I-Frames with consecutive P-Frames depending on the previous frame only. If one frame within a dependency chain is missing, the decoding of consecutive frames can not be guaranteed, and they might be erroneous.

Each frame is divided into so-called macro-blocks. Each macro-block can be of the type Intra, Inter or Skip. Intra-Blocks contain the complete information of that block and can be decoded independently. Inter-Blocks encode the differences between the actual content of the block and previous content. Motion compensation describes the displacement of the content between the frames. Motion compensation does not influence the decodability measure. Skip-Blocks indicate that the content of an area represented by the block exists in the previous frame, too.

It is assumed that one frame consists of one packet only. Given that each of the packets contains synchronization information, and the information within a packet is not lost if previous packets of the same frame are lost, the frame error rate and the packet error rate are the same. Having dependencies between packets, the frame error rate has to be derived from the packet error rate.

The basic idea is to optimize the number of decodable frames under the assumption that each decoded frame has got the same importance. To achieve that goal, additional information about the structures and dependencies of the encoded video frames is used to calculate the priority.

Decoding errors within one frame may propagate to subsequent video frames because of these dependencies, but these errors may be corrected by independently decodable Intra-Blocks later.

Each frame k consists of several macro-blocks. The decodability $I_{k,l}$ of the macro-block l represents the probability by which this block can be decoded without errors. These $I_{k,l}$ depend on the expected error rate $\Delta\epsilon_k$ of the encoded frame, the macro block type (Inter-, Intra- or Skip), eventually on a block $\hat{I}_{k-1,l'}$ of the previous frame, and can be written as $$I_{k,l} = \begin{cases} 1 - \epsilon_k & \text{Intra blocks} \\ (1 - \epsilon_k)\hat{I}_{k-1,l'} & \text{for Inter blocks} \\ I_{k-1,l} & \text{Skip blocks} \end{cases} \quad (1.)$$

The reference block $\hat{I}_{k-1,l'}$ need not be a macro block, but can be any 16×16 block of the previous frame (given that half-pixel motion compensation is neglected). Skip-blocks simply copy the contents of the previous frame, therefore $\hat{I}_{k-1,l'} = I_{k-1,l}$.

The expected error rate $\epsilon_k$ is not only influenced by transmission losses, but by the transmission algorithm as well. The decision not to transmit a packet leaves $\epsilon_k = 1.0$. The expected error rate of a frame being transmitted is be the error rate of the transmission path.

Figure 9:
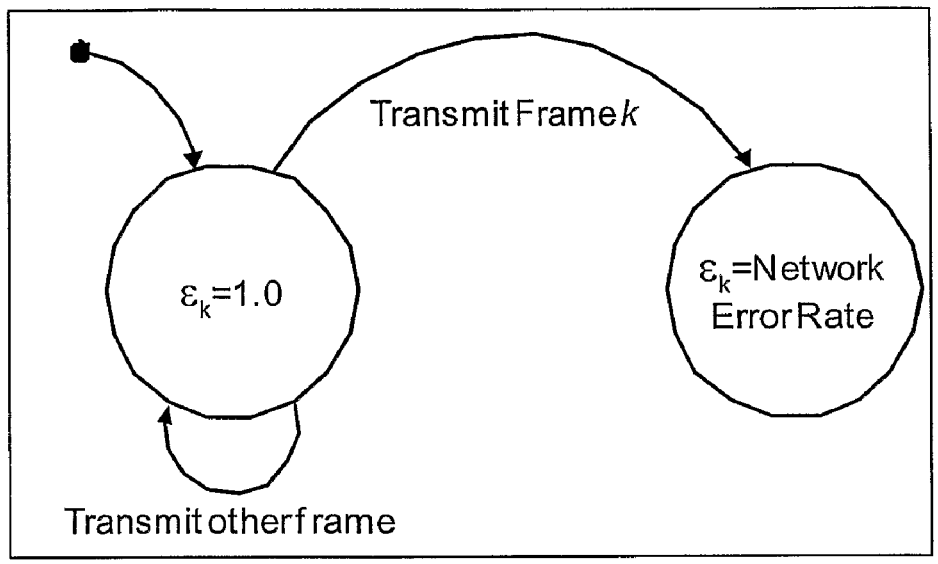
FIG. 9 illustrates a state diagram of the expected error without forward error control.

FIG. 9 illustrates the different values of $\epsilon_k$ given that no forward error correction (FEC) is used in a state diagram of the expected error $\epsilon_k$.

A subset $N_{I,k}$ of the macro-blocks belonging to a frame are independently decodable Intra-blocks, $N_{S,k}$ shall contain all Skip-blocks, and finally $N_{P,k}$ represents the Inter-blocks. Using this definition, the decodability $I_k$ of a frame can be defined as the mean value of its block decodabilities $$I_k = \frac{1}{n}\sum_l I_{k,l} \quad (2.)$$

$$= \frac{1}{n}\left\{\sum_{l \in N_{I,k}}(1 - \epsilon_k) + \sum_{l \in N_{P,k}}(1 - \epsilon_k)\hat{I}_{k-1,l'} + \sum_{l \in N_{S,k}}I_{k-1,l}\right\}$$

$$= \frac{1}{n}\left\{n_{I,k}(1 - \epsilon_k) + (1 - \epsilon_k)\sum_{l \in N_{P,k}}\hat{I}_{k-1,l'} + \sum_{l \in N_{S,k}}I_{k-1,l}\right\},$$

where $n_{I,k}$, $n_{P,k}$ and $n_{S,k}$ are the size of the sets $N_{I,k}$, $N_{P,k}$ and $N_{S,k}$ respectively, and $n = n_{I,k} + n_{P,k} + n_{S,k}$. The more important symbols are subsumed in the following table.

| | |
|---|---|
| k | Frame Index |
| k' | Index of Frame to transmit |
| l | Block Index |
| $I_{k,l}$ | Decodability of a macro-block |
| $I_k$ | Decodability of a frame |
| I | Decodability of the stream |
| $\epsilon_k$ | Expected frame error rate |
| $\Delta\epsilon_{k'}$ | Expected change of $\epsilon_{k'}$ due to transmission |
| n | Number of blocks per frame |
| $n_{I,k}$ | Number of Intra-Blocks in frame |
| $n_{P,k}$ | Number of Inter-Blocks in frame |
| $n_{S,k}$ | Number of Skip-Blocks in frame |
| $P_k$ | Priority of frame k |
| $\hat{I}_{k,k'}(\Delta\epsilon_{k'})$ | Effect of the transmission of frame k' on frame k |
| $|P_k|$ | Normalized priority of frame k |
| $s_k$ | Size of frame k |

If there are enough Inter- and Skip-Blocks, and relations in the space or time dimension are neglected, the decodability of the blocks of the previous frame can be approximated by the total decodability of the previous frame.

$$\sum_{l \in N_{P,k}} \hat{I}_{k-1,l'} = n_{P,k} \cdot I_{k-1} \quad (3.)$$

$$\sum_{l \in N_{S,k}} \hat{I}_{k-1,l} = n_{S,k} \cdot I_{k-1}.$$

This filters the effect of the motion compensation in the frames and simplifies the model. The expression for the decodability $I_k$ can then be written as $$I_k = \frac{n_{I,k}}{n}(1 - \epsilon_k) + \frac{1}{n}[(1 - \epsilon_k) \cdot n_{P,k} + n_{S,k}] \cdot I_{k-1}. \quad (4.)$$

This recursion can not be written in a closed form without further constraints. It can either be applied to an actual video stream or transformed assuming constant parameters.

Generally, if $I_k=0$, no part of a frame can be decoded; if $I_k=1$, it is guaranteed that the frame can be decoded. If either only a part of the frame can be decoded or there are probabilities of packet loss, $I_k$ is between these values.

More interesting than the decodability of the frame is its total effect on the decodability of the video stream. The information within every macro-block propagates to later frames due to consecutive Skip- or Inter-Blocks. If there are K frames, the decodability of the complete video stream is $$I = \frac{1}{K}\sum_{k=1}^{K} I_k. \tag{5.}$$

The transmission of a frame k' changes its expected error rate $\epsilon_{k'}$. To assess the effect of the transmission of a frame on the stream decodability, its partial derivative is needed $$\frac{\partial I}{\partial \varepsilon_{k'}} = \frac{1}{K}\sum_{k=1}^{K}\frac{\partial r_k}{\partial \varepsilon_{k'}}, \tag{6.}$$

with $$\frac{\partial I_k}{\partial \varepsilon_{k'}} = \begin{cases} \frac{1}{n}[(1-\varepsilon_k)n_{P,k} + n_{s,k}]\frac{\partial I_{k-1}}{\partial \varepsilon_{k'}} & |k' \neq k \\ -\frac{1}{n}(n_{I,k'} + n_{P,k'}I_{k'-1}) + (1-\varepsilon_k)\underbrace{\frac{\partial I_{k-1}}{\partial \varepsilon_{k'}}}_{=0} & |k' = k. \end{cases} \tag{7.}$$

This formula illustrates the fact that the information of a frame is encoded within its Intra- and Inter-Blocks (k'=k) and this information propagates through Inter- and Skip-Blocks. There is no back-propagation within the model, so a frame can not have any influence on previous ones (the last term is always zero for k≦k').

The transmission of a frame k' has got an effect onto the stream decodability. This effect shall be reflected by the priority of a frame. If the expected error rate $\epsilon_{k'}$ changes from a previous value of e to e−$\Delta\epsilon_{k'}$, the priority $P_{k'}$ can be calculated as $$P_{k'} = \int_{e}^{e-\Delta\varepsilon_{k'}} \frac{\partial I}{\partial \varepsilon_{k'}} d\varepsilon_{k'} = \tag{8.}$$

$$\int_{e}^{e-\Delta\varepsilon_{k'}} \frac{1}{K}\left(\sum_{k=1}^{K}\frac{\partial I_k}{\partial \varepsilon_{k'}}\right)d\varepsilon_{k'} = \frac{1}{K}\sum_{k=1}^{K}\int_{e}^{e-\Delta\varepsilon_{k'}}\frac{\partial I_k}{\partial \varepsilon_{k'}}d\varepsilon_{k'},$$

with $$\int_{e}^{e-\Delta\varepsilon_{k'}}\frac{\partial I_k}{\partial \varepsilon_{k'}}d\varepsilon_{k'} = \tag{9.}$$

$$\begin{cases} \frac{1}{n}[(1-\varepsilon_k)n_{P,k} + n_{s,k}]\int_{e}^{e-\Delta\varepsilon_{k'}}\frac{\partial I_{k-1}}{\partial \varepsilon_{k'}}d\varepsilon_{k'} & |k' \neq k \\ \frac{1}{n}(n_{I,k'} + n_{P,k'}I_{k'-1})\Delta\varepsilon_{k'} & |k' = k \end{cases}.$$

The value of $\Delta\epsilon_{k'}$ depends on e. Usually, $\Delta\epsilon_{k'}$ has a value of 1-FRER, where FRER is the expected frame error rate and depends on the network.

Figure 10:
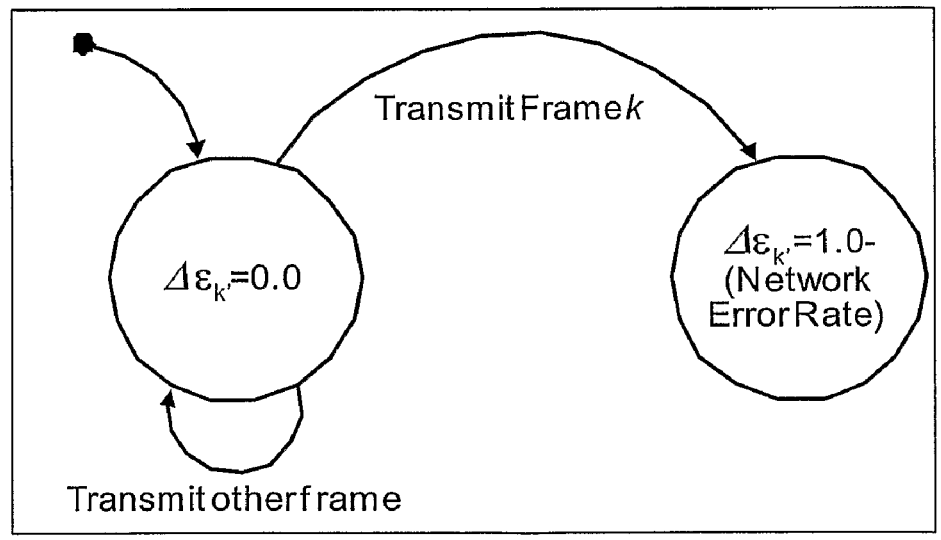
FIG. 10 illustrates a state diagram of the change of the expected error.

FIG. 10 shows a state diagram of the change $\Delta\epsilon_{k'}$ of the expected error, no FEC.

To simplify the notation, a new indicator variable $\hat{I}_{k,k'}(\Delta\epsilon_{k'})$ is defined representing the effect a transmission of frame k' has on the decodability of frame k, if the expected error rate of k' is reduced by $\Delta\epsilon_{k'}$:

$$\hat{I}_{k,k'}(\Delta\varepsilon_{k'}) := \int_{e}^{e-\Delta\varepsilon_{k'}}\frac{\partial I_k}{\partial \varepsilon_{k'}}d\varepsilon_{k'} \tag{10.}$$

$$= \begin{cases} \frac{1}{n}[(1-\varepsilon_k)n_{P,k} + n_{s,k}]\hat{I}_{k-1,k'}(\Delta\varepsilon_{k'}) & |k' \neq k \\ \frac{1}{n}(n_{I,k'} + n_{P,k'}I_{k'-1})\Delta\varepsilon_{k'} & |k' = k \end{cases}.$$

The video stream model does not include back-propagation. Therefore, the calculation of the priority can be simplified by taking only the transmitted and consecutive frames into account. Together with the definition of $\hat{I}_{k,k'}(\Delta\epsilon_{k'})$, the priority can be written as $$P_{k'} = \frac{1}{K}\sum_{k=1}^{K}\hat{I}_{k,k'}(\Delta\varepsilon_{k'}) = \frac{1}{K}\sum_{k=k'}^{K}\hat{I}_{k,k'}(\Delta\varepsilon_{k'}). \tag{11.}$$

In addition, the valid elements within the sum are all the consecutive frames within a GOF only. With the beginning of the next GOF each $\hat{I}_{k,k'}(\Delta\epsilon_k)$ will be zero, because $n_{P,k}=n_{S,k}=0$ for the next I-frame. A scheduler should transmit the frames with the highest priorities.

Using the above formulas it is possible to optimize the overall quality of a video if only a certain number of frames can be transmitted. However, usually not the number of frames is the limiting factor but the available bandwidth. This results in a limited number of bytes which can be transmitted in a certain time. Therefore, a transmission algorithm has to maximize the amount of priority it can transmit in a fixed time interval. This can be done by defining and using the normalized priority $|P_{k'}|$. Assuming a constant bandwidth for this time interval, the normalization can be done by calculating the priority per Byte. Given that $s_{k'}$ is the number of bytes of the encoded frame k', its normalized priority is $$|P_{k'}| = \frac{P_{k'}}{s_{k'}}. \tag{12.}$$

The necessity of this size correction factor will be shown by the simulation results. Approaches with this size factor are called rate-decodability optimized or shortly rate optimized. If the priorities $P_{k'}$ are used, the algorithm is frame optimized.

The concept of decodability can be evaluated in several ways making different assumptions. Three significant algorithms applying the decodability and will be discussed together with their assumptions within this section. Two parameters are varied: The values of $n_{I,k}$, $n_{S,k}$ and $n_{P,k}$ are either considered constant or taken from the stream, and the frame error rates can be assumed constant or calculated dynamically. This results in static or dynamic priority values during the transmission.

Static Priorities from Constant Values

The recurrence for $I_k$ and $\hat{I}_{k,k'}$ can be solved and evaluated for constant values of $n_{I,k}$, $n_{S,k}$, $n_{P,k}$ and $\epsilon_k$. Using these fixed values, static priorities can be calculated.

Preconditioned that all the variables $n_{I,k}$, $n_{S,k}$, $n_{P,k}$ and $\epsilon_k$ do not depend on the frame index k, the recursions can be written in a closed form with the help of the z-transformation. The boundary conditions are given by the fact that the first frame is always an I-Frame. The formulas are valid for one GOF only, because any consecutive I-Frame has $n_{I,k}=n$ and would violate the preconditions. However, the GOFs can be calculated independently if the index of the I-Frame is set to zero. The resulting values don't take a certain stream into account.

The decodability $I_k$ of a frame can be written as $$I_k = \frac{n_{I,k}(1-\varepsilon_k)}{n_{I,k}+\varepsilon_k \cdot n_{P,k}}\left[1-\left(\frac{n-n_{I,k}-\varepsilon_k \cdot n_{P,k}}{n}\right)^k\right] + \left(1-\frac{n_{I,k}+\varepsilon_k \cdot n_{P,k}}{n}\right)^k \Delta\varepsilon_k. \quad (13.)$$

The change of the decodability depends on the block error rate of the network $\Delta\varepsilon_k = 1 - \epsilon_k = 1 - \text{FRER}$.

FIG. 10 depicts $I_k$ for several parameter sets with $\epsilon_k = 0.1$. For $k \to \infty$ the decodability converges to $$I_{k\to\infty} = \frac{n_{I,k}(1-\varepsilon_k)}{n_{I,k}+\varepsilon_k \cdot n_{P,k}}, \quad (14.)$$

i.e. the Intra-Blocks continuously refresh parts of the frame and keep the decodability greater than zero. The first line represents frames where every block type is present (1). Obviously, given that there are I-Frames only, a constant decodability without any dependency is observed (2). The same is true for P-Frames consisting of Skip-Blocks only, but in this case the decodability depends on the first I-Frame (4). The other curves show a decreasing decodability over the length of a GOF—either converging to a constant value if I-Blocks are present (1,3), or to zero if the number of I-Blocks can be neglected (5).

Figure 11:
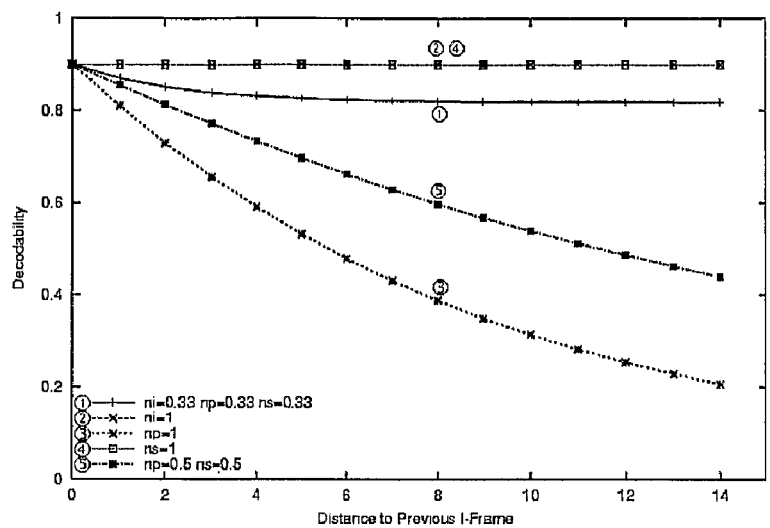
FIG. 11 illustrates a decodability of frames using constant parameters with a group of frame length 15.

FIG. 11 shows a decodability of frames using constant parameters GOF of length 15 and $\epsilon_k = 0.1$.

More important than the decodability is the priority of the frames. As shown within the appendix, the dependency between the frames is taken into account by $$\hat{I}_{k,k'}(\Delta\varepsilon_{k'}) = \left(\frac{1}{n}[(1-\varepsilon_k)n_{P,k}+n_{s,k}]\right)^{k-k'} \cdot \frac{1}{n}(n_{I,k'}+n_{P,k'}I_{k'-1})\Delta\varepsilon_{k'}. \quad (15.)$$

Figure 12:
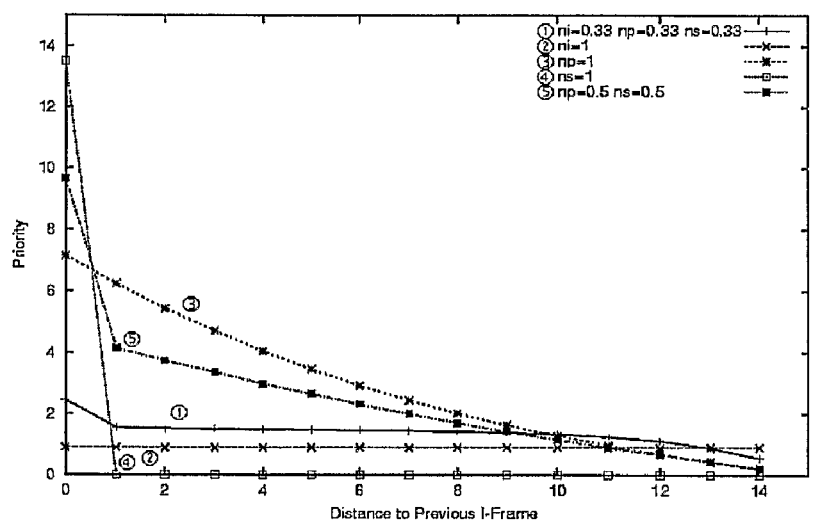
FIG. 12 illustrates a priority of frames using constant parameters.

This formula can be inserted into the expression used to calculate the priority $P_{k'}$ $$P_{k'} = \frac{1}{K}\sum_{k=1}^{K}\hat{I}_{k,k'}(\Delta\varepsilon_{k'}) = \frac{1}{K}\sum_{k=k'}^{K}\hat{I}_{k,k'}(\Delta\varepsilon_{k'}),$$

and depicted for different parameter sets again, as it has been done in FIG. 12.

FIG. 12 shows priority of frames using constant parameters GOF of length 15 and $\epsilon_k = 0.1$.

FIG. 12 reveals the dependencies of the frames. Especially in the case of Skip-Blocks, the I-Frame is highly important because it is responsible for the presentation of the following frames (4). The case of independent frames (2) is now distinguishable from the former case, and has a constant priority $P=(1-\epsilon)$. Especially the mixed case (1) is noteworthy: The priority remains almost constant after the I-Frame and drops towards the end of the GOF, because the effect on consecutive frames due to Inter- and Skip-Blocks obviously ends with the end of the GOF.

The other cases (3, 5) confirm a decreasing priority towards the end of the GOF. The exact type of this decrease depends on the parameters, but the analytical results support the strategy of dropping frames at the end of a GOF.

Static Priorities from Stream Statistics

The real block statistics (nI,k, nS,k and nP,k) are extracted from the stream or read from the logfile of the encoder; $\epsilon_k$ is set to a fixed value, leading to static priority values, too.

If the true values of $n_{I,k}$, $n_{S,k}$ and $n_{P,k}$ are extracted from the video stream and the priorities are calculated using these values, the simulation results should improve. However, the proper calculation of $\epsilon_k$ turns out to be difficult. The values of $\epsilon_k$ reflect two properties of the transmission system: The first one is the decision of the scheduler to transmit or skip a packet, the second one is the mean error rate of the network. The later effect shall be neglected for simplicity.

$\epsilon_k$ shall be approximated by a constant parameter for this method. However, there are several ways to do so: If the skipped packets are uniformly distributed, this constant value should reflect the probability of a skip, i.e. be equivalent to the expected fraction of skipped frames. However, initial experiments support the results of the last section, and frames at the end of a GOF are skipped preferentially. To this end the error $\epsilon_k$ within the dependency chains of the transmitted frames is zero. This can be generalized by setting the constant error rate $\epsilon_k$ to the frame error rate of the network.

Nevertheless, the simulation results will show that this method did not improve the transmission as expected.

Dynamic Priorities

Again, the real block statistics are used, and k is updated while the transmission is in progress. This results in dynamic priorities.

It is possible to apply the formulas without simplifications. In that case the varying values of the frame error $\epsilon_k$ have to be taken into account and the priorities will be dynamic. Therefore, this priority assignment algorithm is quite complex and has an increased processing power requirement.

The exact values of $n_{I,k}$, $n_{S,k}$ and $n_{P,k}$ are used and every $\epsilon_k$ is initialized with 1.0. After every transmission of a frame, its expected error is updated and all the dependent priorities within the same GOF have to be recalculated.

Even though the embodiments have been described as individual examples, it is explicitly noted that some or all of the embodiments may be combined, as desired.

Further, a program may be provided having instructions adapted to carry out any of the operations of the above methods.

A computer readable medium may embody the program and a computer program product may comprise the computer readable medium.

The above embodiments illustrate aspects of the invention for prioritising data elements of a data stream for transmission to a receiving device, including determining a decodability of data elements at a receiving device, and for prioritising the data elements based on the decodability and further factors, such as an overall decodability increase achievable by transmitting a data element, and further under consideration of an error-prone data transmission medium. The above embodiments outline assigning priority values to data elements, e.g. for streaming video files, particularly over a transmission medium with variable bandwidth, if bandwidth requirements may not be met. The priority values can be generated from the structure of the stream which can then be used by appropriate scheduling algorithms to drop the least important parts of the video and optimise the decodability of that stream.

The invention claimed is:

1. A transmission device for prioritising data elements of a data stream for transmission to a receiving device, comprising:
    decodability determining means for determining a decodability of a current data element, the decodability indicating the extent to which the current data element is decodable at the receiving device;
    prioritising means for assigning a priority to the current data element based on the determined decodability; and
    a transmitter controller for scheduling a transmission of the current data element to the receiving device based on the priority, wherein, the data stream comprises: independent data elements being independent from other data elements and dependent data elements being dependent on at least one reference data element, wherein the decodability determining means is configured to set the decodability of an independent data element to a maximum decodability and to set the decodability of a dependent data element equal to the decodability of the reference data element, when the reference data element has been transmitted.

2. The transmission device of claim 1, wherein the decodability determining means is configured to determine the decodability of the current data element using information on which of a plurality of data elements were transmitted to the receiving device.

3. The transmission device of claim 1, wherein the decodability determining means is configured to receive a feedback from the receiving device indicating which of the data elements were received error free.

4. The transmission device of claim 1, wherein the decodability determining means is configured to, if the current data element requires a reference data element for being fully decodable at the receiving device, the set decodability of the current data element equal to the decodability of the reference data element, when the reference data element has been transmitted.

5. The transmission device of claim 1, wherein the decodability determining means is configured to, if the current data element requires multiple reference data elements for being fully decodable at the receiving device, determining the decodability of the current data element based on the decodabilities of the reference data elements.

6. The transmission device of claim 1 wherein the decodability determining means is configured to recalculate the decodability of at least a portion of the data elements upon transmission of the current data element.

7. The transmission device of claim 1, wherein, upon transmission of the current data element, the decodability determining means is configured to recalculate a decodability of data elements indicated in a decoding dependency record of the current data element, the decoding dependency record indicating all data elements requiring the current data element for decoding.

8. The transmission device of claim 1, wherein the decodability determining means is configured to:
    determine an average decodability of a number of data elements;
    determine a decodability increase of the average decodability of the number of data elements obtainable by transmitting the current data element; and
    determine the priority of the current data element based on the decodability increase.

9. The transmission device of claim 1, wherein the transmitter controller is configured to estimate the probability of an error-free transmission over a transmission channel.

10. The transmission device of claim 1, wherein the decodability determining means is configured to determine the decodability as the product of the extent to which the current data element is decodable at the receiving device and the probability of an error-free transmission of the current data packet over a transmission channel.

11. The transmission device of claim 10, wherein the decodability determining means is configured to:
    set the decodability of an independent data element to the determined probability; and
    set the decodability of a dependent data element to the determined probability times the decodability determined based on the decodability the at least one reference data element.

12. The transmission device of claim 1, wherein the decodability determining means is configured to set the decodability of the reference data element equal the decodability of a data frame containing the reference data element.

13. The transmission device of claim 1, wherein the data stream is a video stream and motion compensation is disregarded.

14. A transmission device for prioritising data elements of a data stream for transmission to a receiving device, comprising:
    decodability determining means for determining a decodability of a current data element, the decodability indicating the extent to which the current data element is decodable at the receiving device;
    prioritising means for assigning a priority to the current data element based on the determined decodability; and
    a transmitter controller for scheduling a transmission of the current data element to the receiving device based on the priority, wherein the data stream comprises:
    intra-blocks being independent from other data elements and the decodability of an intra-block being set to a maximum decodability, indicating that the intra-block is fully decodable at the receiving device;
    inter-blocks encoding differences between content of a data element and content of a reference data block, the decodability of an inter-block being set equal to the decodability of the reference data block; and
    skip-blocks indicating content requiring content of a reference data block, the decodability of a skip-block being set equal to the decodability of the reference data block.

15. The transmission device of claim 14, wherein the prioritising means is configured to determine the priority of the current data element based on the decodability increase divided by the data element size of the current data element.

16. The transmission device of claim 14, wherein the number of data elements represents data elements of a predetermined time window of the data stream or of the entire data stream.

17. The transmission device of claim 14, wherein
    the decodability determining means is configured to set:
    the decodability of an intra-block equal to the probability of an error-free transmission;
    the decodability of an inter-block equal to the decodability of the reference data block multiplied by the probability of an error-free transmission; and
    the decodability of a skip-block independent of the probability of an error-free transmission.

18. A method for prioritising data elements of a data stream for transmission to a receiving device, comprising:
    determining a decodability of a current data element, the decodability indicating the extent to which the current data element is decodable at the receiving device;

assigning a priority to the current data element based on the determined decodability; and scheduling a transmission of the current data element to the receiving device based on the priority, wherein, the data stream comprises: independent data elements being independent from other data elements and dependent data elements being dependent on at least one reference data element, wherein the decodability of an independent data element is set to a maximum decodability and the decodability of a dependent data element is set equal to the decodability of the reference data element, when the reference data element has been transmitted.

19. The method of claim 18, including determining the decodability of the current data element using information on which of a plurality of data elements were transmitted to the receiving device.

20. The method of claim 18, including receiving a feedback from the receiving device indicating which of the data elements were received error free.

21. The method of claim 18, wherein, if the current data element requires a reference data element for being fully decodable at the receiving device, the decodability of the current data element is set equal to the decodability of the reference data element, when the reference data element has been transmitted.

22. The method of claim 18, wherein, if the current data element requires multiple reference data elements for being fully decodable at the receiving device, the decodability of the current data element is determined based on the decodabilities of the reference data elements.

23. The method of claim 18, including recalculating the decodability of at least a portion of the data elements upon transmission of the current data element.

24. The method of claim 18, including, upon transmission of the current data element, recalculating a decodability of data elements indicated in a decoding dependency record of the current data element, the decoding dependency record indicating all data elements requiring the current data element for decoding.

25. The method of claim 18, including determining an average decodability of a number of data elements;

determining a decodability increase of the average decodability of the number of data elements obtainable by transmitting the current data element; and determining the priority of the current data element based on the decodability increase.

26. The method of claim 25, including determining the priority of the current data element based on the decodability increase divided by the data element size of the current data element.

27. The method of claim 25, wherein the number of data elements represents data elements of a predetermined time window of the data stream or of the entire data stream.

28. The method of claim 25, including setting the decodability of an intra-block equal to the probability of an error-free transmission;

setting the decodability of an inter-block equal to the decodability of the reference data block multiplied by the probability of an error-free transmission; and setting the decodability of a skip-block independent of the probability of an error-free transmission.

29. The method of claim 18, including estimating the probability of an error-free transmission over a transmission channel.

30. The method of claim 18, including setting the decodability of the reference data element equal the decodability of a data frame containing the reference data element.

31. The method of claim 18, wherein the data stream is a video stream and motion compensation is disregarded.

32. A method for prioritising data elements of a data stream for transmission to a receiving device, comprising:

determining a decodability of a current data element, the decodability indicating the extent to which the current data element is decodable at the receiving device assigning a priority to the current data element based on the determined decodability; and scheduling a transmission of the current data element to the receiving device based on the priority, wherein the data stream comprises:

intra-blocks being independent from other data elements and the decodability of an intra-block being set to a maximum decodability, indicating that the intra-block is fully decodable at the receiving device;

inter-blocks encoding differences between content of a data element and content of a reference data block, the decodability of an inter-block being set equal to the decodability of the reference data block; and skip-blocks indicating content requiring content of a reference data block, the decodability of a skip-block being set equal to the decodability of the reference data block.

33. The method of claim 32, including determining the decodability as the product of the extent to which the current data element is decodable at the receiving device and the probability of an error-free transmission of the current data packet over a transmission channel.

34. The method of claim 33, including setting the decodability of an independent data element to the determined probability; and setting the decodability of a dependent data element to the determined probability times the decodability determined based on the decodability the at least one reference data element.

* * * * *

UNITED STATES PATENT AND TRADEMARK OFFICE
CERTIFICATE OF CORRECTION

PATENT NO. : 7,843,959 B2
APPLICATION NO. : 10/597453
DATED : November 30, 2010
INVENTOR(S) : Kampmann et al.

It is certified that error appears in the above-identified patent and that said Letters Patent is hereby corrected as shown below:

In Fig. 5, Sheet 3 of 8, for Tag "503", in Line 3, delete "DEDODABILITY" and insert -- DECODABILITY --, therefor.

In Column 12, Line 45, delete "difference" and insert -- different --, therefor.

In Column 20, Line 11, before "this embodiment", delete "the".

In Column 22, Line 13, delete "$N_{i,k}$" and insert -- $N_{i,k}$ --, therefor.

In Column 22, Lines 51-53, delete " $\sum_{l \in N_{S,k}} \hat{I}_{k-1,l} = n_{S,k} \cdot I_{k-1}$ " and insert -- $\sum_{l \in N_{S,k}} I_{k-1,l} = n_{S,k} \cdot I_{k-1}$ --, therefor.

In Column 23, Lines 20-21, in Equation (6.), delete " $\frac{\partial I}{\partial \varepsilon_{k'}} = \frac{1}{K} \sum_{k=1}^{K} \frac{\partial r_k}{\partial \varepsilon_{k'}}$ " and insert -- $\frac{\partial I}{\partial \varepsilon_{k'}} = \frac{1}{K} \sum_{k=1}^{K} \frac{\partial I_k}{\partial \varepsilon_{k'}}$ --, therefor.

In Column 23, Line 24, delete "$(\Delta \in_k)$" and insert -- $(A \in_{k'})$ --, therefor.

Signed and Sealed this
Twenty-ninth Day of May, 2012

David J. Kappos
*Director of the United States Patent and Trademark Office*

In Column 26, Line 31, delete "k" and insert -- $\in_k$ --, therefor.

In Column 30, Line 24, in Claim 32, delete "device" insert -- device; --, therefor.